US011906669B2

(12) United States Patent
Nagata

(10) Patent No.: US 11,906,669 B2
(45) Date of Patent: Feb. 20, 2024

(54) DISTANCE INFORMATION ACQUISITION DEVICE, MULTIPATH DETECTION DEVICE, AND MULTIPATH DETECTION METHOD

(71) Applicant: Panasonic Semiconductor Solutions Co., Ltd., Kyoto (JP)

(72) Inventor: Megumi Nagata, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 814 days.

(21) Appl. No.: 17/037,465

(22) Filed: Sep. 29, 2020

(65) Prior Publication Data
US 2021/0011130 A1 Jan. 14, 2021

Related U.S. Application Data

(63) Continuation of application No. PCT/JP2019/010567, filed on Mar. 14, 2019.

(60) Provisional application No. 62/649,994, filed on Mar. 29, 2018.

(51) Int. Cl.
| | |
|---|---|
| *G01S 7/487* | (2006.01) |
| *G01S 17/10* | (2020.01) |
| *G01S 17/89* | (2020.01) |
| *G01S 7/4865* | (2020.01) |
| *H04N 25/533* | (2023.01) |

(52) U.S. Cl.
CPC .......... *G01S 7/487* (2013.01); *G01S 7/4865* (2013.01); *G01S 17/10* (2013.01); *G01S 17/89* (2013.01); *H04N 25/533* (2023.01)

(58) Field of Classification Search
CPC ........ G01S 7/487; G01S 17/89; G01S 7/4865; G01S 17/10; G01S 17/894; H04N 5/3535; H04N 25/533
USPC ....................................................... 356/5.01
See application file for complete search history.

(56) References Cited

FOREIGN PATENT DOCUMENTS

WO 2015/189311 A1 12/2015

OTHER PUBLICATIONS

International Search Report issued in corresponding iInternational Application No. PCT/JP2019/010567, dated May 28, 2019, with English translation.

(Continued)

*Primary Examiner* — Daniel L Murphy
(74) *Attorney, Agent, or Firm* — Rimon P.C.

(57) ABSTRACT

A distance information acquisition device includes: a light emitter which emits light according to an emission pulse indicating emission; a solid-state imaging element which performs exposure according to an exposure pulse indicating exposure; an emission/exposure controller which generates a timing signal indicating a plurality of pairs of the emission pulse and the exposure pulse having a time difference that is different in each of the plurality of pairs; and a multipath detector which obtains a sequence of received light signals from the solid-state imaging element by the emission and the exposure that correspond to each of the plurality of pairs, compares the obtained sequence of received light signals and reference data created in advance as a model of a sequence of received light signals in a multipath-free environment, and determines the presence or absence of multipath according to a difference in a comparison result.

17 Claims, 26 Drawing Sheets

(56) References Cited

OTHER PUBLICATIONS

D. Freedman, et al., "SRA: Fast removal of general multipath for ToF sensors," In Proceedings of the 13th European Conference on Computer Vision (ECCV 14), pp. 234-249.

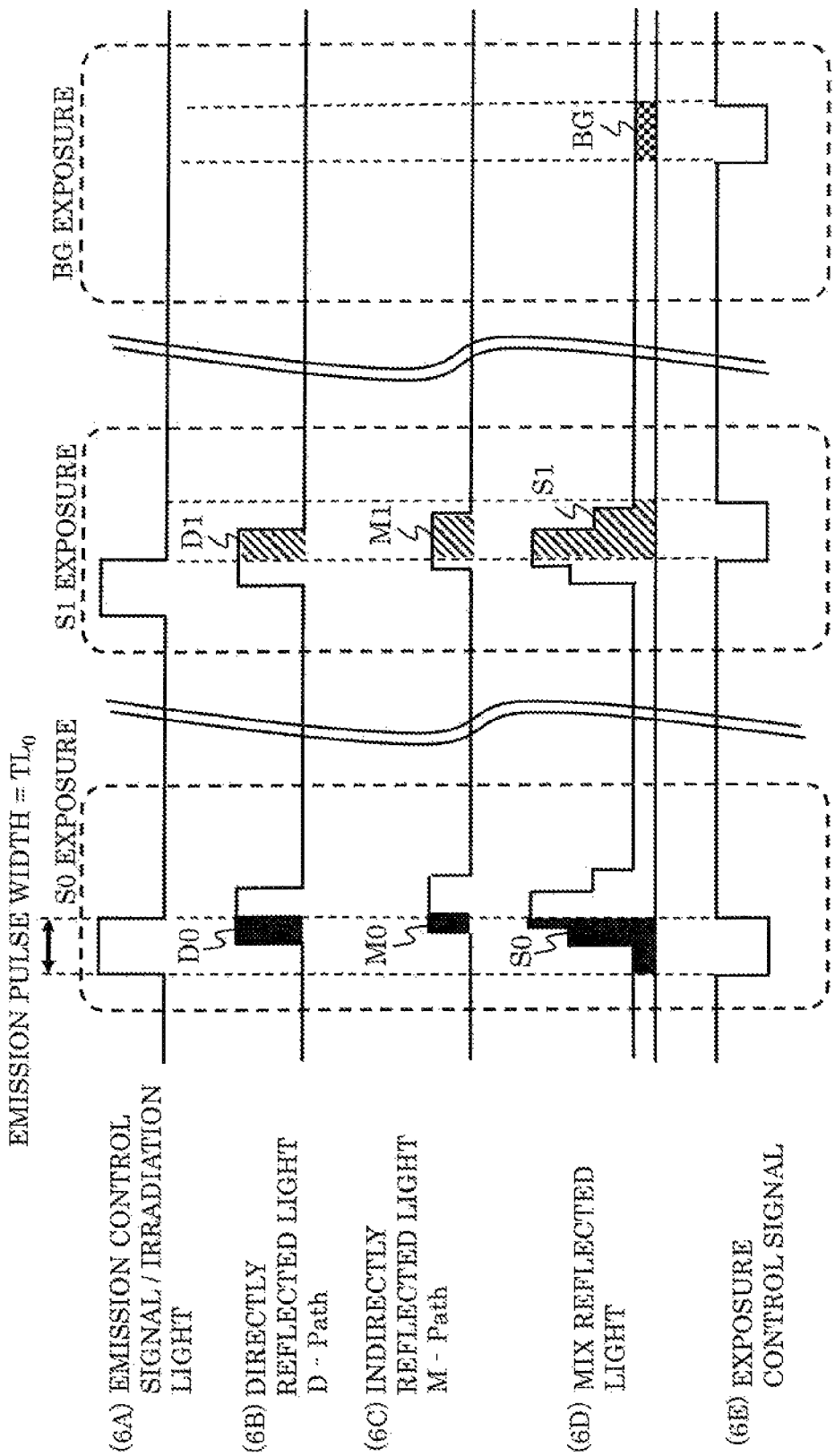

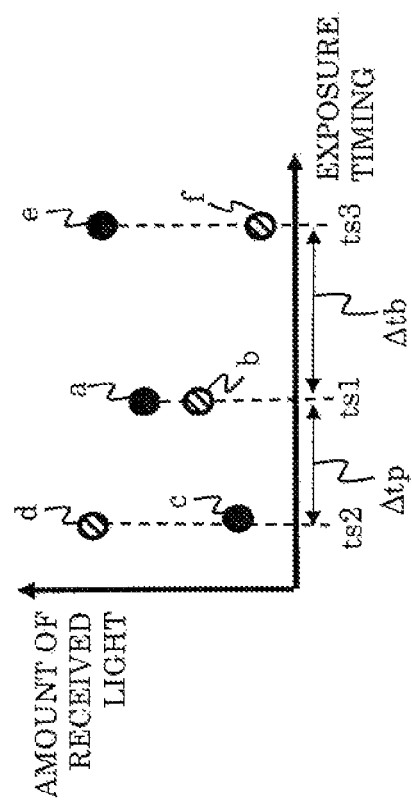

DISTANCE INFORMATION ACQUISITION DEVICE, MULTIPATH DETECTION DEVICE, AND MULTIPATH DETECTION METHOD

CROSS REFERENCE TO RELATED APPLICATIONS

This application is a U.S. continuation application of PCT International Patent Application Number PCT/JP2019/010567 filed on Mar. 14, 2019, claiming the benefit of priority of U.S. Provisional Patent Application No. 62/649,994 filed on Mar. 29, 2018, the entire contents of which are hereby incorporated by reference.

BACKGROUND

1. Technical Field

The present disclosure relates to a distance information acquisition device, a multipath detection device, and a multipath detection method which measures a distance using the time of flight (ToF) method.

2. Description of the Related Art

Generally, with a ToF camera system that measures a distance on the basis of the time of flight of light reflected by an object, measurement accuracy is degraded due to an increase in measurement errors in a multipath environment in which directly reflected light and indirectly reflected light are mixed. To address this issue, for example, International Publication No. WO2015/189311 (Patent Literature (PTL) 1) and D. Freedman, E. Krupka, Y. Smolin, I. Leichter, and M. Schmidt, "SRA: Fast removal of general multipath for ToF sensors" in Proceedings of the 13th European Conference on Computer Vision (ECCV 2014). 234-249 (Non-Patent Literature (NPL) 1) propose ToF cameras that reduce the effects of multipath.

SUMMARY

However, the ToF camera system in PTL 1 includes a special, dedicated lighting unit and thus is problematic in that the device cost is high. The ToF camera system in NPL 1 is problematic in that the amount of calculations for determining the presence or absence of multipath is enormous, in other words, processing load is heavy. Therefore, for determination of the presence or absence of multipath in NPL 1, a high throughput calculating machine such as a personal computer (PC) is capable of real-time processing, but a compact ToF camera system that does not achieve such high throughput is not suited to real-time processing.

The present disclosure aims to provide a distance information acquisition device, a multipath detection device, and a multipath detection method in which processing load for detecting multipath can be lessened and costs can be reduced.

In order to solve the aforementioned problems, a distance information acquisition device according to one aspect of the present disclosure includes: a light emitter which emits light according to an emission pulse indicating emission; a solid-state imaging element which performs exposure according to an exposure pulse indicating exposure; an emission/exposure controller which generates a timing signal indicating a plurality of pairs of the emission pulse and the exposure pulse that have a time difference, the time difference being different in each of the plurality of pairs; and a multipath detector which obtains a sequence of received light signals from the solid-state imaging element by the emission and the exposure that correspond to each of the plurality of pairs, compares the sequence of received light signals that has been obtained and reference data created in advance as a model of a sequence of received light signals in a multipath-free environment, and determines a presence or absence of multipath according to a difference in a comparison result.

Furthermore, a multipath detection device according to one aspect of the present disclosure detects multipath using a light emitter which emits light according to an emission pulse indicating emission and a solid-state imaging element which performs exposure according to an exposure pulse indicating exposure. The multipath detection device includes: an emission/exposure controller which generates a timing signal indicating a plurality of pairs of the emission pulse and the exposure pulse that have a time difference, the time difference being different in each of the plurality of pairs; and a multipath detector which obtains a sequence of received light signals from the solid-state imaging element by the emission and the exposure that correspond to each of the plurality of pairs, compares the sequence of received light signals that has been obtained and reference data created in advance as a model of a sequence of received light signals in a multipath-free environment, and determines a presence or absence of multipath according to a difference in a comparison result.

Furthermore, a multipath detection method according to one aspect of the present disclosure is for detecting multipath using a light emitter which emits light according to an emission pulse indicating emission and a solid-state imaging element which performs exposure according to an exposure pulse indicating exposure. The multipath detection method includes: generating a timing signal indicating a plurality of pairs of the emission pulse and the exposure pulse that have a time difference, the time difference being different in each of the plurality of pairs; obtaining a sequence of received light signals from the solid-state imaging element by the emission and the exposure that correspond to each of the plurality of pairs; comparing the sequence of received light signals that has been obtained and reference data created in advance as a model of a sequence of received light signals in a multipath-free environment; and determining a presence or absence of multipath according to a difference in a comparison result.

With the distance information acquisition device, the multipath detection device, and the multipath detection method according to the present disclosure, it is possible to lessen processing load for detecting multipath and reduce costs.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 is a timing chart for explaining an operation example for causing a measurement error due to a multipath environment in the ToF method (II);

FIG. 14B illustrates one example of a sequence of received light signals in a first operation example of a multipath detector according to Embodiment 2;

DETAILED DESCRIPTION OF THE EMBODIMENTS

Underlying Knowledge of Inventor

In relation to the lighting device disclosed in the BACKGROUND section, the inventor has found the problem indicated below.

First, a distance information acquisition device according to the underlying knowledge of the inventor will be described as a comparative example.

Figure 1:
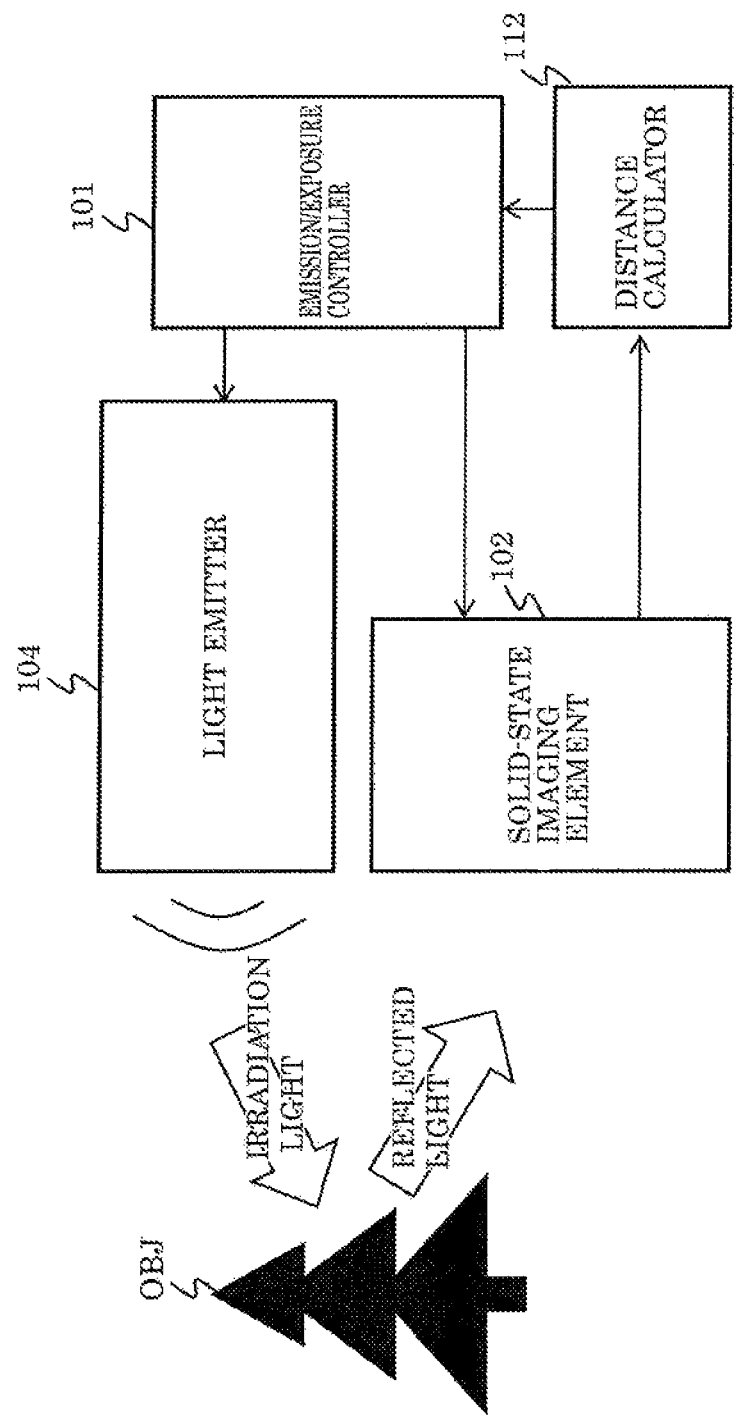
FIG. 1 is an explanatory diagram illustrating a distance measurement operation performed by a distance information acquisition device in a comparative example when multipath is absent.

FIG. 1 illustrates the configuration of the distance information acquisition device in the comparative example according to the underlying knowledge of the inventor. This figure also includes illustration of object OBJ which is a target whose distance information is to be acquired. The distance information acquisition device in this figure is a distance measurement device using the ToF method and includes emission/exposure controller 101, solid-state imaging element 102, and light emitter 104.

Emission/exposure controller 101 generates an emission control signal having an emission pulse for instructing light emitter 104 to emit light and an exposure control signal having an exposure pulse for instructing solid-state imaging element 102 to perform exposure.

Solid-state imaging element 102 performs exposure, in other words, captures an image, according to the exposure pulse of the exposure control signal.

Light emitter 104 emits light, in other words, emits irradiation light, according to the emission pulse of the emission control signal.

Distance calculator 112 calculates a distance for each pixel using sequences of received light signals obtained by at least three types of exposure processing.

Next, as an operation example of the distance information acquisition device in the comparative example, the ToF method (I) and the ToF method (II) will be described.

Figure 2:
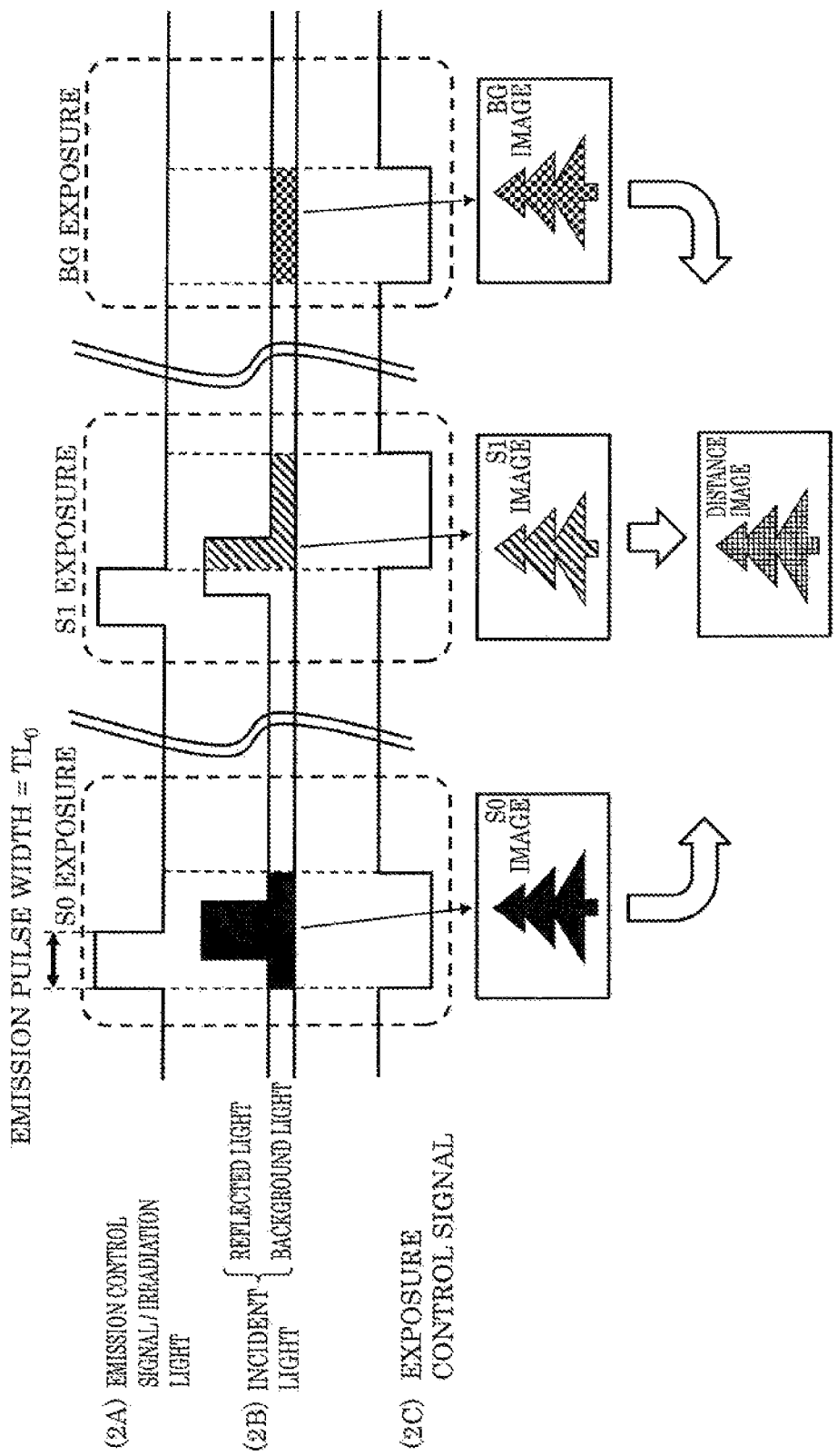
FIG. 2 is a timing chart for explaining the ToF method (I)

FIG. 2 is a timing chart for explaining the ToF method (I). This figure also includes examples of captured images. In this figure, (2A) an emission control signal having an emission pulse (or irradiation light from light emitter 104), (2B) incident light on solid-state imaging element 102, and (2C) an exposure control signal having an exposure pulse are illustrated. The emission pulse in this figure is a positive logic pulse which is active-high, and the exposure pulse in this figure is a negative logic pulse which is active-low. (2B) The incident light includes background light and irradiation light reflected by object OBJ. There is delay time between the irradiation light and the reflected light according to the distance between the distance information acquisition device and the object. The black-painted area (one place) and the hatched areas (two places) of the incident light in this figure correspond to received light signals for each pixel.

The emission/exposure processing for measuring a distance includes S0 exposure, S1 exposure, and BG exposure.

In the S0 exposure, the exposure pulse becomes active at the same time as the start of the emission pulse. In other words, the exposure starts at the same time as the emission. Furthermore, the pulse width of the exposure pulse is greater than the pulse width of the emission pulse. In the S0 exposure, for example, the exposure is possible over the leading portion of the reflected light or the entire reflected light.

In the S1 exposure, the exposure pulse becomes active at the same time as the end of the emission pulse. In other words, the exposure starts at the end of the emission. Furthermore, the pulse width of the exposure pulse is the same as the pulse width of the emission pulse. In the S1 exposure, for example, the exposure is possible over the delayed portion of the reflected light after the end of the irradiation light.

In the BG exposure, the exposure pulse becomes active with no emission pulse, and exposure to background light without the reflected light is performed.

Distance calculator 112 calculates distance L for each pixel using the amount of received light signals (signal charge amount) at each pixel in the S0 exposure, the S1 exposure, and the BG exposure. Suppose that the amounts of received light signals (in other words, the amount of signal charge generated by receiving light) at each pixel in the S0 exposure, the S1 exposure, and the BG exposure are S0, S1, and BG, distance L for each pixel is calculated according to Expression 1. In the expression, c is the speed of light (approximately, 299 792 458 m/s), and $TL_0$ is the time width of the emission pulse.

[Math. 1]

$$L = \frac{c \times TL_0}{2} \times \frac{S1 - BG}{S0 - BG} \qquad \text{Expression 1}$$

Subsequently, as an operation example of the distance information acquisition device in the comparative example, the ToF method (II) will be described.

Figure 3:
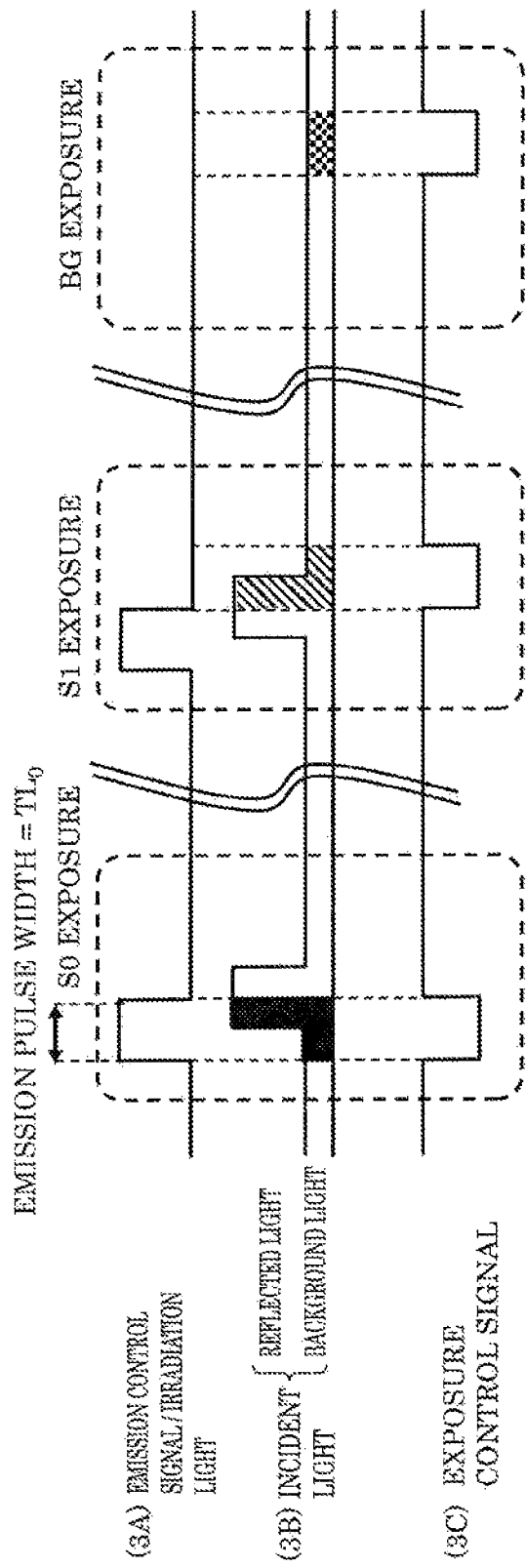
FIG. 3 is a timing chart for explaining the ToF method (II)

FIG. 3 is a timing chart for explaining the ToF method (II). In this figure, as in FIG. 2, (3A) the waveform of an emission control signal (or irradiation light from light emitter 104), (3B) the waveform of incident light, and (3C) the waveform of an exposure control signal are illustrated. FIG. 3 is different from FIG. 2 in that the width of the exposure pulse is the same as the width of the emission pulse. In this case, distance L is calculated for each pixel according to Expression 2.

[Math. 2]

$$L = \frac{c \times TL_0}{2} \times \frac{S1 - BG}{(S0 - BG) + (S1 - BG)} \qquad \text{Expression 2}$$

The above TOF methods (I) and (II) are problematic in that a measurement error occurs in a multipath environment in which directly reflected light and indirectly reflected light are mixed.

Next, the mechanism of how a measurement error occurs in the operation of the distance information acquisition device in the comparative example in the multipath environment will be described.

Figure 4:
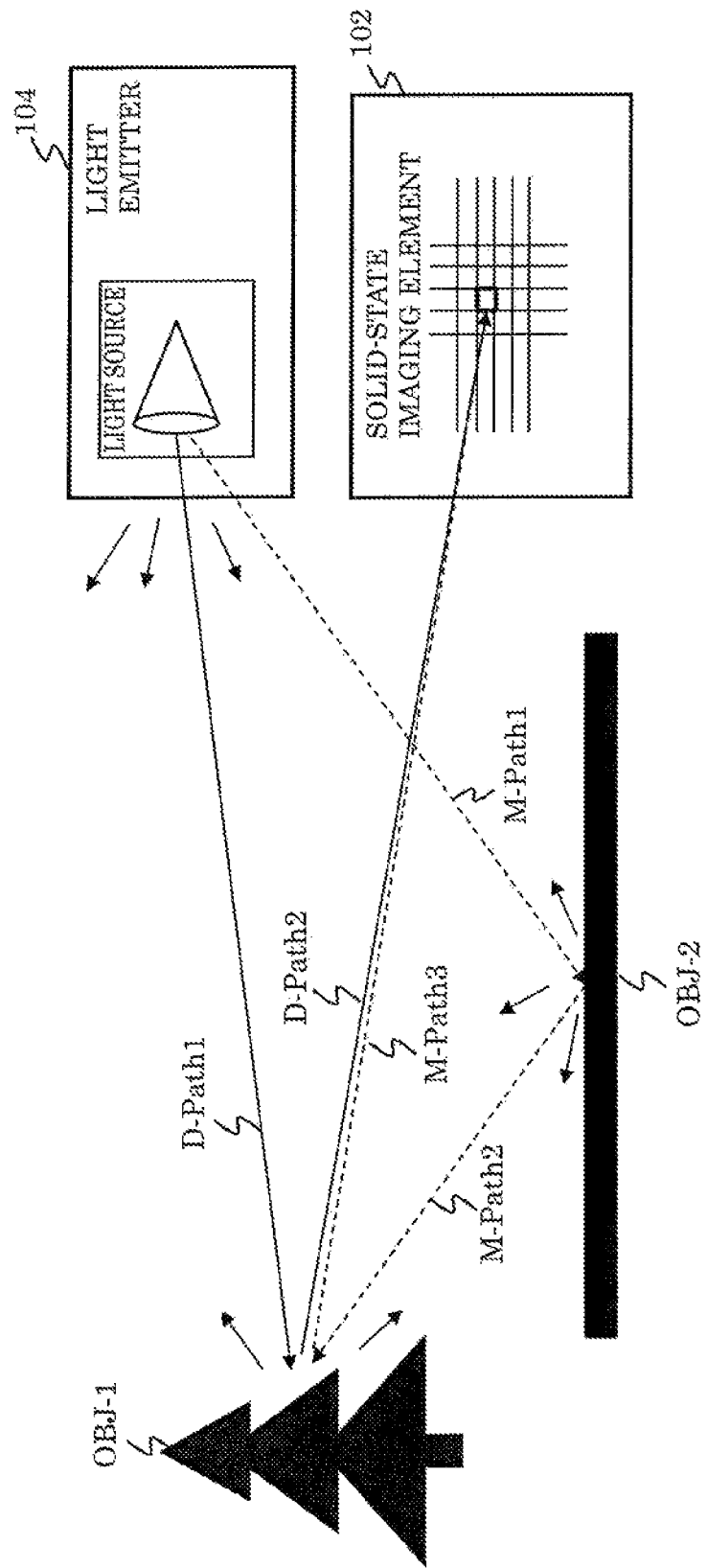
FIG. 4 is an explanatory diagram illustrating a distance measurement operation performed in one example of a multipath environment by a distance information acquisition device in a comparative example.

FIG. 4 is an explanatory diagram illustrating the distance measurement operation performed in one example of the multipath environment by the distance information acquisition device in the comparative example. This figure also includes illustration of object OBJ-1 which is a distance measurement target and illustration of object OBJ-2 which reflects the irradiation light to generate indirect irradiation light.

FIG. 4 illustrates an example of a multipath environment in which there are direct irradiation light D-Path1, directly reflected light D-Path2, indirect irradiation light M-Path1, M-Path2, and indirectly reflected light M-Path3.

Figure 5:
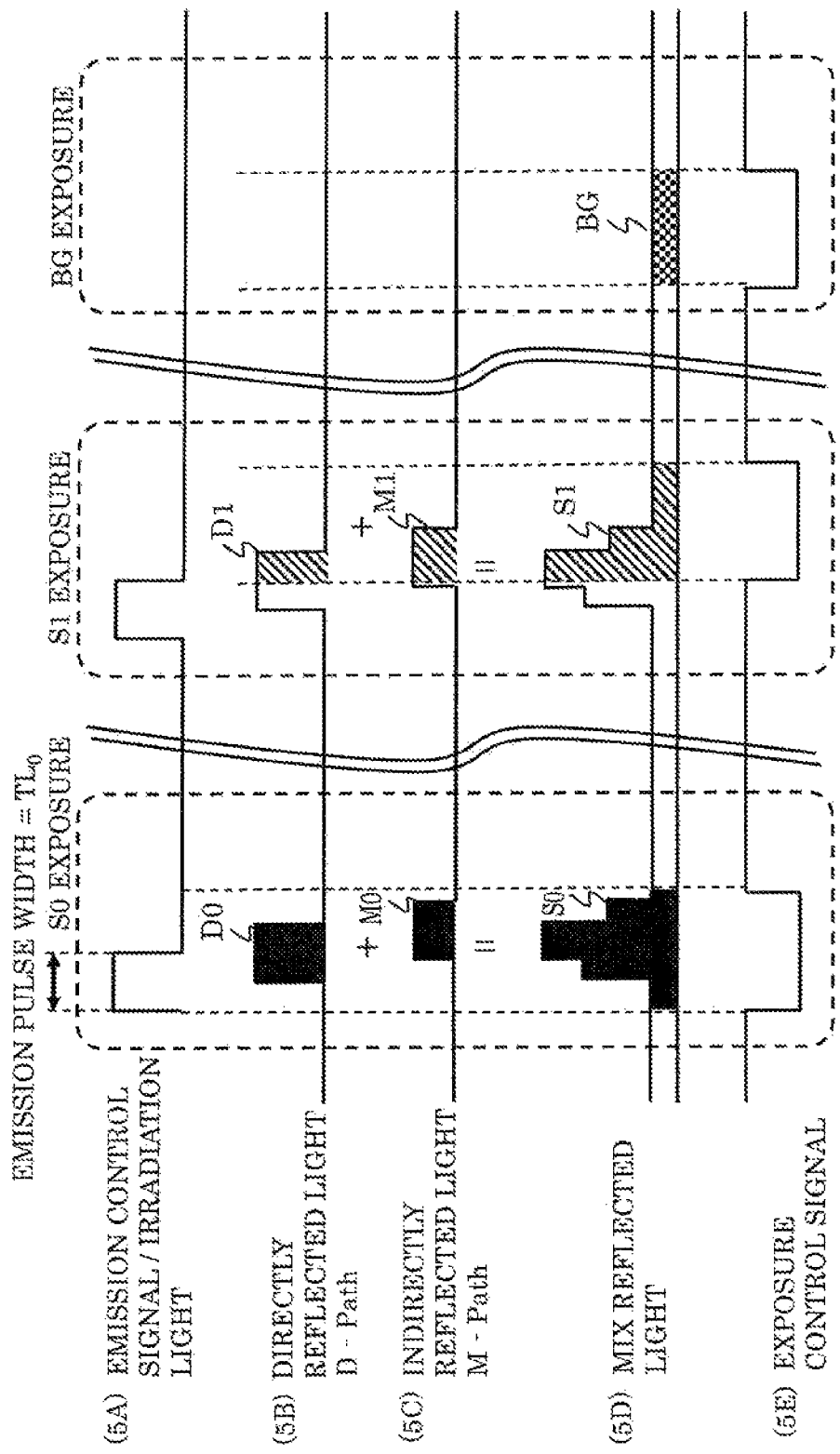
FIG. 5 is a timing chart for explaining an operation to cause a measurement error due to a multipath environment in the ToF method (I)

FIG. 5 is a timing chart for explaining an operation to cause a measurement error due to a multipath environment in the ToF method (I). This figure illustrates (5A) an emission control signal or irradiation light, (5B) directly reflected light D-Path, (5C) indirectly reflected light M-Path, (5D) mix reflected light which is the sum of the directly reflected light and the indirectly reflected light, and (5E) an exposure control signal. Among these, (5A) the emission control signal or the irradiation light, (5B) directly reflected light D-Path, and (5E) the exposure control signal are the same as (2A) the emission control signal (or the irradiation light), (2B) the incident light, and (2C) the exposure control signal illustrated in FIG. 2. In other words, FIG. 5 is a diagram obtained by adding, to FIG. 2, (5C) indirectly reflected light M-Path and (5D) the mix reflected light.

Amount S0 of received light signals in the S0 exposure is the sum of amount D0 of received light signals based on the directly reflected light and amount M0 of received light signals based on the indirectly reflected light. Similarly, amount S1 of received light signals in the S1 exposure is the sum of amount D1 of received light signals based on the directly reflected light and amount M1 of received light signals based on the indirectly reflected light.

When applied to FIG. 5, Expression 1 for calculating distance L for each pixel in the ToF method (I) is Expression 3. Note that amount BG of received light signals based on the background light is 0 and is negligible.

[Math. 3]

$$L = \frac{c \times TL_0}{2} \times \frac{D1 + M1}{D0 + M0} \qquad \text{Expression 3}$$

In Expression 3, amounts M0, M1 of received light signals based on the indirectly reflected light have values that do not depend on the distance to object OBJ-1, but depend on a nearby object, and thus distance L calculated according to Expression 3 includes an error unpredictable from object OBJ-1, meaning that the measurement accuracy may be slightly degraded or may be significantly degraded.

FIG. 6 is a timing chart for explaining an operation to cause a measurement error due to a multipath environment in the ToF method (II). This figure illustrates (6A) an emission control signal or irradiation light, (6B) directly reflected light D-Path, (6C) indirectly reflected light M-Path, (6D) mix reflected light which is the sum of the directly reflected light and the indirectly reflected light, and (6E) an exposure control signal. FIG. 6 is a diagram obtained by adding, to FIG. 3, (6C) indirectly reflected light M-Path and (6D) the mix reflected light.

Amount S0 of received light signals in the S0 exposure is the sum of amount D0 of received light signals based on the directly reflected light and amount M0 of received light signals based on the indirectly reflected light. Similarly, amount S1 of received light signals in the S1 exposure is the sum of amount D1 of received light signals based on the directly reflected light and amount M1 of received light signals based on the indirectly reflected light. When applied to FIG. 6, Expression 2 for calculating distance L for each pixel in the ToF method (II) is Expression 4. Note that amount BG of received light signals based on the background light is 0 and is negligible.

[Math. 4]

$$L = \frac{c \times TL_0}{2} \times \frac{D1 + M1}{(D0 + M0) + (D1 + M1)} \quad \text{Expression 4}$$

In Expression 4, amounts M0, M1 of received light signals based on the indirectly reflected light have values that do not depend on the distance to object OBJ-1, but depend on a nearby object, and thus distance L calculated according to Expression 4 includes an error unpredictable from object OBJ-1, meaning that the measurement accuracy may be slightly degraded or may be significantly degraded.

The ToF camera system in PTL 1 mentioned above includes a special, dedicated lighting unit for multipath, which degrades the distance measurement accuracy as just described, and thus is problematic in that the device cost is high. NPL 1 is also problematic in that processing load for determining the presence or absence of multipath is heavy.

Thus, the present disclosure aims to provide a distance information acquisition device, a multipath detection device, and a multipath detection method in which processing load for detecting multipath can be lessened and costs can be reduced.

In order to solve the aforementioned problems, a distance information acquisition device according to one aspect of the present disclosure includes: a light emitter which emits light according to an emission pulse indicating emission; a solid-state imaging element which performs exposure according to an exposure pulse indicating exposure; an emission/exposure controller which generates a timing signal indicating a plurality of pairs of the emission pulse and the exposure pulse that have a time difference, the time difference being different in each of the plurality of pairs; and a multipath detector which obtains a sequence of received light signals from the solid-state imaging element by the emission and the exposure that correspond to each of the plurality of pairs, compares the sequence of received light signals that has been obtained and reference data created in advance as a model of a sequence of received light signals in a multipath-free environment, and determines a presence or absence of multipath according to a difference in a comparison result.

Furthermore, a multipath detection device according to one aspect of the present disclosure detects multipath using a light emitter which emits light according to an emission pulse indicating emission and a solid-state imaging element which performs exposure according to an exposure pulse indicating exposure. The multipath detection device includes: an emission/exposure controller which generates a timing signal indicating a plurality of pairs of the emission pulse and the exposure pulse that have a time difference, the time difference being different in each of the plurality of pairs; and a multipath detector which obtains a sequence of received light signals from the solid-state imaging element by the emission and the exposure that correspond to each of the plurality of pairs, compares the sequence of received light signals that has been obtained and reference data created in advance as a model of a sequence of received light signals in a multipath-free environment, and determines a presence or absence of multipath according to a difference in a comparison result.

Furthermore, a multipath detection method according to one aspect of the present disclosure is for detecting multipath using a light emitter which emits light according to an emission pulse indicating emission and a solid-state imaging element which performs exposure according to an exposure pulse indicating exposure. The multipath detection method includes: generating a timing signal indicating a plurality of pairs of the emission pulse and the exposure pulse that have a time difference, the time difference being different in each of the plurality of pairs; obtaining a sequence of received light signals from the solid-state imaging element by the emission and the exposure that correspond to each of the plurality of pairs; comparing the sequence of received light signals that has been obtained and reference data created in advance as a model of a sequence of received light signals in a multipath-free environment; and determining a presence or absence of multipath according to a difference in a comparison result.

With this, it is possible to lessen processing load for detecting multipath and reduce costs.

Hereinafter, embodiments of the present disclosure will be described in detail with reference to the drawings.

Note that each of the embodiments described below shows a general or specific example of the present disclosure. The numerical values, shapes, materials, structural elements, the arrangement and connection of the structural elements, steps, the processing order of the steps etc. shown in the following embodiments are mere examples, and therefore do not limit the present disclosure. Among the structural elements in the following embodiments, structural elements not recited in any one of the independent claims defining the most generic concept are described as arbitrary structural elements.

Embodiment 1

[1.1 Configuration Example of Distance Information Acquisition device 100]

Figure 7A:
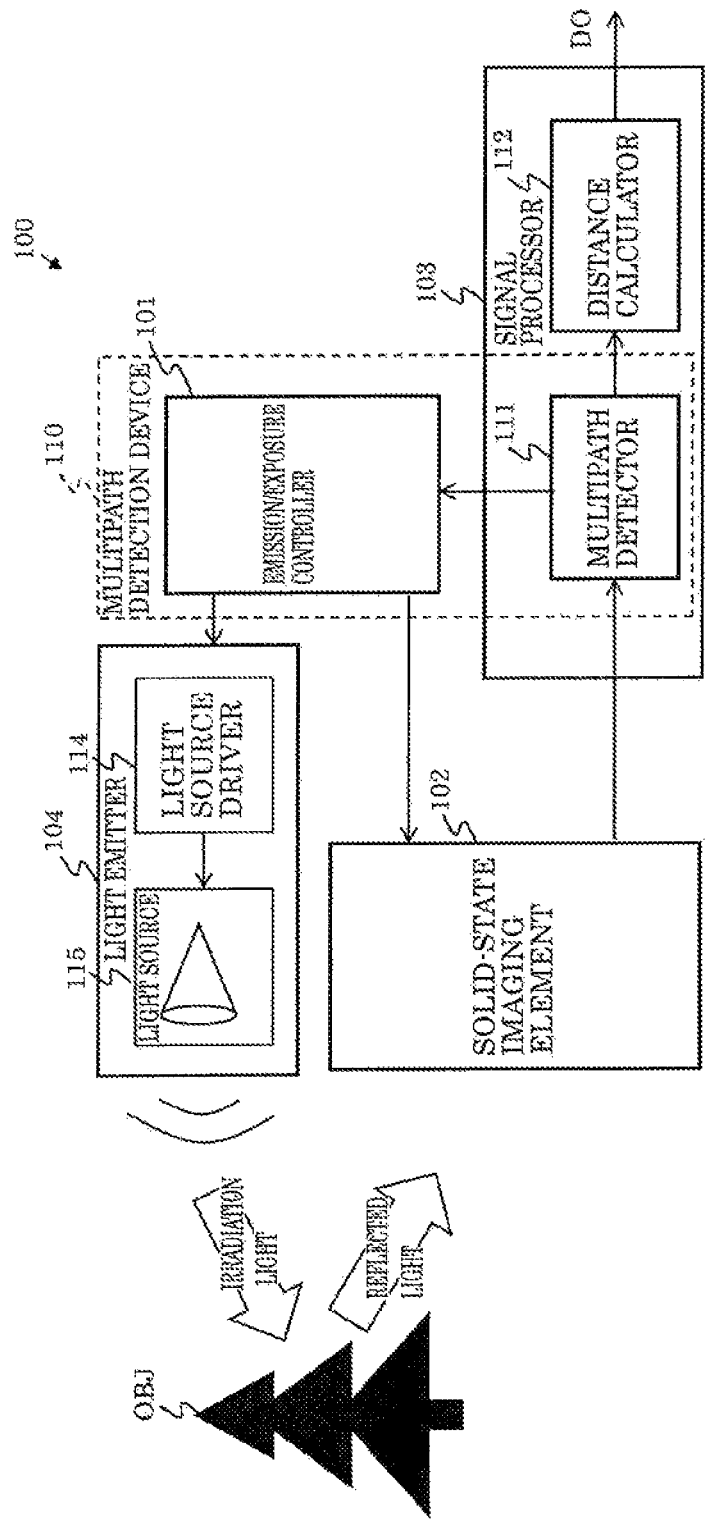
FIG. 7A is a block diagram illustrating a configuration example of a distance information acquisition device according to Embodiment 1.

FIG. 7A is a block diagram illustrating a configuration example of distance information acquisition device 100 according to Embodiment 1. This figure also includes schematic illustration of object OBJ which is a target whose distance information is to be acquired, irradiation light, and reflected light.

Distance information acquisition device 100 in this figure is a distance measurement device using the ToF method and includes emission/exposure controller 101, solid-state imaging element 102, signal processor 103, and light emitter 104. Light emitter 104 includes light source driver 114 and light source 115. A circuit part including emission/exposure controller 101 and multipath detector 111 in FIG. 7A corresponds to multipath detection device 110 which determines the presence or absence of multipath.

Emission/exposure controller 101 generates a timing signal indicating emission and exposure in a multipath detection operation and a normal distance measurement operation. Specifically, in the multipath detection operation, emission/exposure controller 101 generates a timing signal indicating a plurality of pairs of an emission pulse for instructing light emitter 104 to emit light and an exposure pulse for instructing solid-state imaging element 102 to perform exposure, and the emission pulse and the exposure pulse has a time difference that is different in each of the plurality of pairs. This timing signal includes, for example, an emission control signal having an emission pulse for instructing light emitter 104 to emit light and an exposure control signal having an exposure pulse for instructing solid-state imaging element 102 to perform exposure. Furthermore, emission/exposure controller 101 generates (2A) the emission control signal and (2C) the exposure control signal in the ToF method (I) illustrated in FIG. 2 or generates (3A) the emission control signal and (3C) the exposure control signal in the ToF method (II) illustrated in FIG. 3 in the normal distance measurement operation.

Solid-state imaging element 102 is an image sensor including two-dimensionally arranged pixels and performs exposure, in other words, captures an image, according to the exposure pulse of the exposure control signal.

Signal processor 103 includes multipath detector 111 and distance calculator 112.

Multipath detector 111 performs the multipath detection operation as follows. Specifically, multipath detector 111 obtains a sequence of received light signals from solid-state imaging element 102 by emission and exposure that correspond to each of the plurality of pairs indicated by the aforementioned timing signal, compares the obtained sequence of received light signals and reference data created in advance as a model of received light signals in a multipath-free environment, and determines the presence or absence of multipath according to a difference in the comparison result. Furthermore, when determining that multipath is present, multipath detector 111 calculates a correction factor for each pixel, and outputs the calculated correction factor to distance calculator 112.

When multipath detector 111 determines that multipath is absent, distance calculator 112 calculates distance L for each pixel by the ToF method (I) illustrated in FIG. 2 or the ToF method (II) illustrated in FIG. 3, and generates a distance image. When multipath detector 111 determines that multipath is present, distance calculator 112 calculates distance L for each pixel by the ToF method (I) illustrated in FIG. 2 or the ToF method (II) illustrated in FIG. 3, furthermore corrects distance L using the correction factor, and generates a distance image.

Note that signal processor 103 may include a microcomputer, a microcontroller, and a digital signal processor (DSP). The microcomputer, the microcontroller, or the digital signal processor (DSP) includes memory in which a program for detecting multipath is stored and a central processing unit (CPU) that executes the program.

Light emitter 104 includes light source driver 114 and light source 115. Light source driver 114 causes light source 115 to emit light according to the emission pulse of the emission control signal. Light source 115 outputs irradiation light under control of light source driver 114. The irradiation light is pulsed at the same timing as the emission pulse and may be, for example, near infrared light.

[1.2 Configuration Example of Multipath Detector 111]

Next, a configuration example of multipath detector 111 will be described.

Figure 7B:
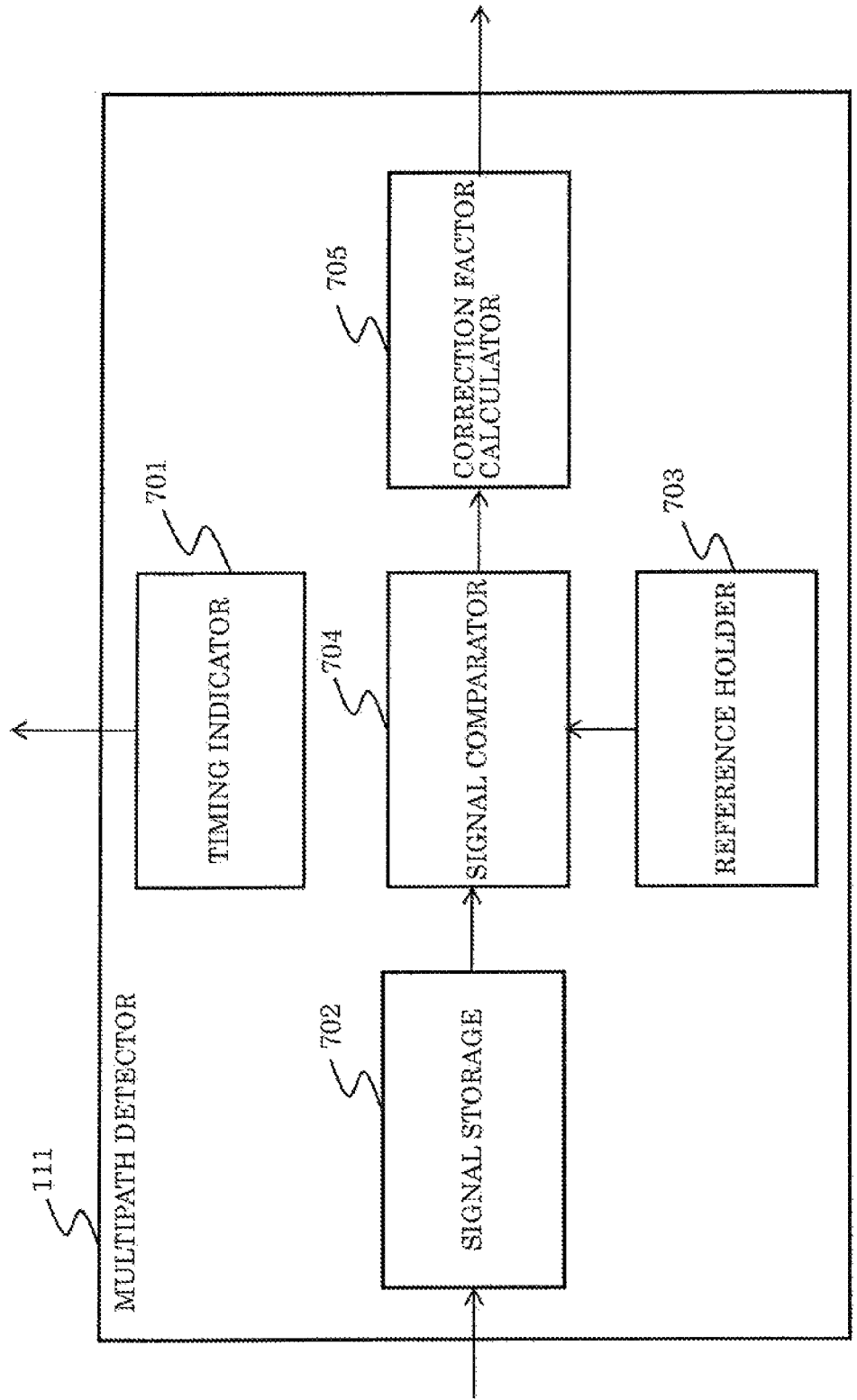
FIG. 7B is a block diagram illustrating a configuration example of a multipath detector according to Embodiment 1.

FIG. 7B is a block diagram illustrating a configuration example of multipath detector 111 according to Embodiment 1. Multipath detector 111 in this figure includes timing indicator 701, signal storage 702, reference holder 703, signal comparator 704, and correction factor calculator 705.

Timing indicator 701 generates a timing signal indicating a plurality of pairs of the emission pulse and the exposure pulse having a time difference that is different in each of the plurality of pairs.

The plurality of pairs include the first through N-th pairs (N is an integer) in ascending order of the above time difference. Timing indicator 701 generates a timing signal indicating, for example, a time series from the first through N-th pairs, and outputs the timing signal to emission/exposure controller 101. Alternatively, timing indicator 701 generates a timing signal indicating a time series from the N-th through first pairs, and outputs the timing signal to emission/exposure controller 101. Alternatively, timing indicator 701 may generate a timing signal such that one pair selected in ascending order of the time difference and one pair selected in descending order of the time difference are alternate, and output the timing signal to emission/exposure controller 101.

Signal storage 702 obtains a plurality of received light signals from solid-state imaging element 102 by emission and exposure that correspond to each of the plurality of pairs indicated in the timing signal, and stores the plurality of received light signals as a sequence of received light signals. The sequence of received light signals includes a first received light signal to a N-th received light signal respectively corresponding to the first through N-th pairs.

Reference holder 703 stores reference data created in advance as a model of received light signals in a multipath-free environment. The reference data is created through simulations or experiments, assumes, for example, an environment in which directly reflected light is present, but indirectly reflected light is not present, and uses, as a model, a sequence of received light signals obtained by emission and exposure that correspond to the plurality of pairs indicated by the above timing signal in the multipath-free environment. The reference data is represented by the sequence of received light signals or a scalar value indicating the amount of features of the sequence of received light signals. Furthermore, the reference data may be normalized to make the maximum value of the received light signals 1.

Signal comparator 704 compares the sequence of received light signals stored in signal storage 702 and the reference data held in reference holder 703, and determines the presence or absence of multipath according to a difference in the comparison result.

When signal comparator 704 determines that multipath is present, correction factor calculator 705 calculates a per-pixel correction factor corresponding to the difference in the comparison result of signal comparator 704.

[1.3 First Operation Example of Multipath Detection]

Regarding distance information acquisition device 100 according to Embodiment 1 configured as described above, the first operation example of multipath detection will be described first.

Figure 8A:
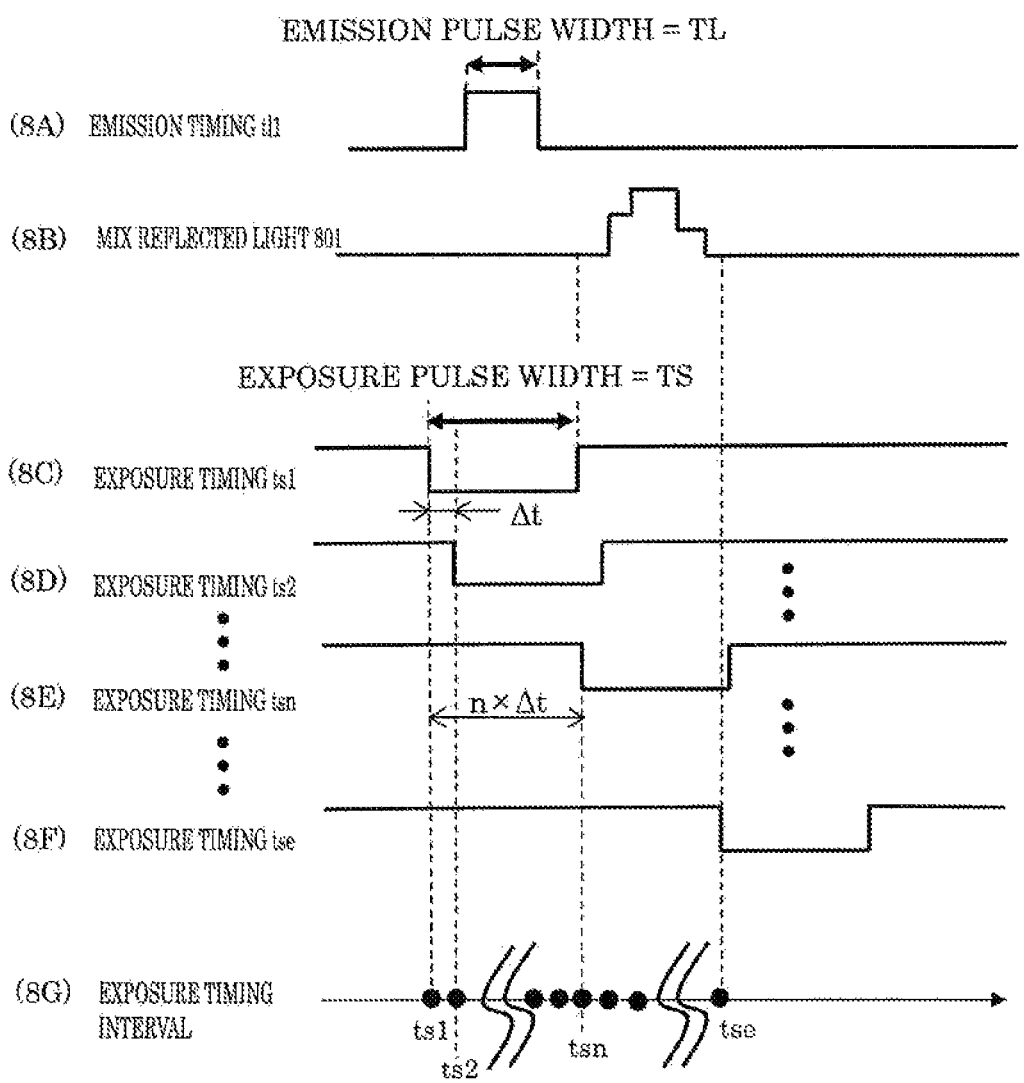
FIG. 8A illustrates a first operation example of emission and exposure timings in a multipath detector according to Embodiment 1.

FIG. 8A illustrates the first operation example of emission and exposure timings in the multipath detector according to Embodiment 1.

First, the signal waveforms illustrated in (8A) to (8G) in FIG. 8A will be described. The signal waveforms illustrated in (8A) to (8G) are not necessarily limited to waveforms on the same time axis and are illustrated to include waveforms on different time axes for convenience of description. The respective timings in this figure are not limited to actual points in time, but can be virtual or theoretical points in time. For example, exposure timing ts1 is a virtual point in time of the received light signal stored in signal storage 702.

(8A) illustrates an emission pulse included in an emission control signal serving as the timing signal generated by timing indicator 701 or irradiation light from light source 115 based on the emission pulse. The timing of the irradiation light or the emission pulse is denoted as emission timing tl1. The pulse width of the emission pulse or the pulse width of the irradiation light is denoted as TL. The emission pulse is active-high, meaning ON in the high level period and OFF in the low level period. This emission pulse represents N emission pulses included in N pairs ranging from the first through N-th pairs indicated by timing indicator 701.

(8B) schematically illustrates one example of mix reflected light including directly reflected light and indirectly reflected light from object OBJ irradiated with the irradiation light in (8A).

(8C) illustrates an exposure pulse included in an exposure control signal serving as the timing signal generated by timing indicator 701, that is, the exposure pulse in the first pair. The timing of the exposure pulse is denoted as exposure timing ts1. The pulse width of the exposure pulse is denoted as TS. The exposure pulse is active-low, meaning exposure (in other words, image capture) in the low level period and non-exposure in the high level period. Stated differently, solid-state imaging element 102 generates, for each pixel, a received light signal corresponding to the amount of received light in the low level period of the exposure pulse.

(8D) illustrates an exposure pulse in the second pair. The timing of the exposure pulse is denoted as exposure timing ts2.

(8E) illustrates an exposure pulse in the n-th pair. The timing of the exposure pulse is denoted as exposure timing tsn. Here, n is an integer of 1 to N. N is the number of pairs from the first through N-th pairs mentioned above.

(8F) illustrates an exposure pulse in the N-th pair. The timing of the exposure pulse is denoted as exposure timing tse.

(8G) illustrates the interval between the start timings of N exposure pulses included in the first through N-th pairs. In FIG. 8A, there is time difference Δt between the start timings of two immediate exposure pulses. Specifically, exposure timings ts1, ts2, . . . , tsn, . . . , tse are at fixed time interval Δt.

Among the plurality of pairs indicated in the timing signal generated by timing indicator 701, the first pair corresponds to (8A, 8C). Here, the wording (8A, 8C) means a pair of the emission pulse (8A) at emission timing tl1 and the exposure pulse (8C) at exposure timing ts1. Similarly, the second pair corresponds to (8A, 8D). The n-th pair (n is an integer of 1 to N) corresponds to (8A, 8E). The N-th pair corresponds to (8A, 8F).

Timing indicator 701 generates a timing signal indicating a time series from the first through N-th pairs or from the N-th through first pairs, and outputs the timing signal to emission/exposure controller 101.

Figure 8B:
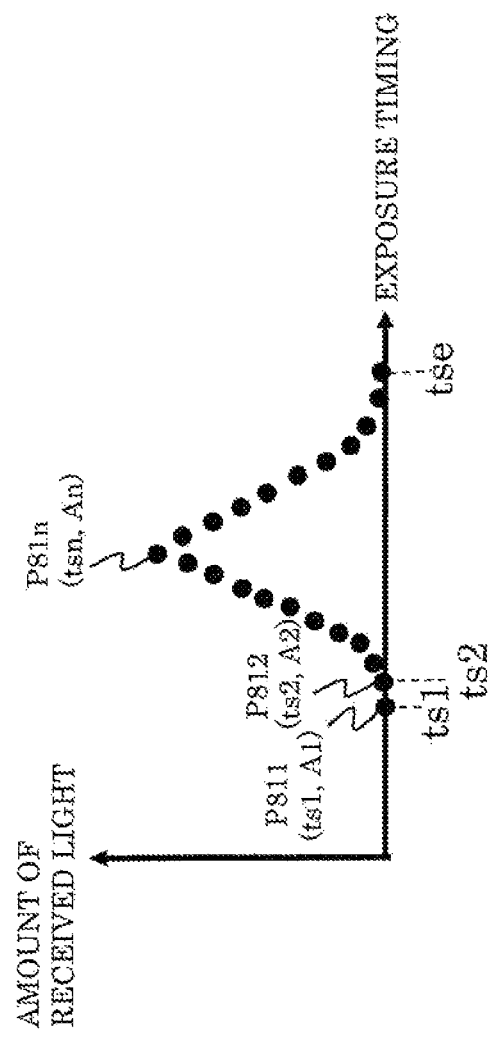
FIG. 8B illustrates one example of a sequence of received light signals in a first operation example of a multipath detector according to Embodiment 1.

FIG. 8B illustrates one example of a sequence of received light signals in the first operation example of the multipath detector according to Embodiment 1. The sequence of received light signals is output from solid-state imaging element 102 by emission and exposure that correspond to each of the plurality of pairs ranging from the first through N-th pairs, and is stored in signal storage 702. The horizontal axis in this figure represents the time axis and corresponds to the exposure timing interval in (8G). The vertical axis in this figure represents the amount of received light that is the amount of signal charge generated at a pixel by exposure. Point P811 plotted in this figure corresponds to the first pair, meaning that (the exposure timing, the amount of received light) is (ts1, A1). Point P812 plotted in this figure corresponds to the second pair, meaning that (the exposure timing, the amount of received light) is (ts2, A2). Point P81n plotted in this figure corresponds to the n-th pair, meaning that (the exposure timing, the amount of received light) is (tsn, An).

Furthermore, one example of an emission/exposure timing indication method performed by timing indicator 701 in the first operation example in FIG. 8A will be specifically described. This timing indication method is to sequentially change the exposure timing with respect to the emission timing in the plurality of pairs. Timing indicator 701 indicates, for emission/exposure controller 101, emission timing tl1 and emission pulse width TL of the irradiation light and exposure timing ts1 and exposure pulse width TS for solid-state imaging element 102 as timings in the first pair. Exposure timing ts1 is set to a point earlier than the reflection timing of mix reflected light 801 including a multipath component corresponding to the irradiation light from light emitter 104 according to emission pulse width TL and emission timing tl1. Amount A1 of received light according to the settings of the timings in the first pair is stored in signal storage 702. Specifically, in signal storage 702, P811 is plotted as exposure timing ts1 and amount A1 of received light with the exposure timing on the horizontal axis and the amount of received light on the vertical axis.

As the timings in the second pair, emission timing tl1 and emission pulse width TL of the irradiation light and exposure pulse width TS for the solid-state imaging element, which are the same as the timing in the first pair, are indicated, and a change to exposure timing ts2, which is different from the timing in the first pair, is indicated. Exposure timing ts2 is delayed from exposure timing ts1 by time difference Δt as a shift amount and is represented by the following expression.

[Math. 5]

$$ts2 = ts1 + \Delta t \qquad \text{Expression 5}$$

Amount A2 of received light according to the settings of the timings in the second pair is stored in signal storage 702. In signal storage 702, P812 is plotted as exposure timing ts2 and amount A2 of received light.

Such changes in the timings are repeated (N−1) times for N emission and exposure processes from the first through N-th pairs. As the timings in the n-th pair (n is an integer of 1 to N), emission timing tl1 and emission pulse width TL of the irradiation light and exposure pulse width TS for solid-state imaging element 102, which are the same as the timing in the first pair, are indicated, and a change to exposure timing tsn, which is different from the timing in the first pair, is indicated. Exposure timing tsn is represented by the following expression.

[Math. 6]

$$tsn = ts1 + n \times t \qquad \text{Expression 6}$$

Amount An of received light according to the settings of the timings in the n-th pair is stored in signal storage 702. In signal storage 702, P81n is plotted as exposure timing tsn and amount An of received light.

Exposure timing tse in the last N-th pair is set to a point later than the reflection timing of mix reflected light 801. When the speed of light is denoted as c and the maximum distance measurement range is denoted as Dmax, it is sufficient that tse satisfy the following.

[Math. 7]

$$tse > 2 \times Dmax/c + TL \qquad \text{Expression 7}$$

Maximum distance measurement range Dmax represents the greatest distance the reflected light based on the irradiation light can be received.

In FIG. 8A, Δt is illustrated as an equal interval, but this is not limiting. Multipath can be more accurately detected as Δt is reduced, but a longer time is required for the measurement as Δt becomes small. It is possible to reduce the length of measurement time while maintaining multipath detection accuracy by setting Δt small only around timings earlier and later than mix reflected light 801, which is important to detect multipath, and setting Δt large for an intermediate data portion therebetween. Furthermore, a portion at a long interval of Δt can be estimated using the linear interpolation.

Next, multipath detection by signal comparator 704 in the first operation example, in other words, a method for determining the presence or absence of multipath, will be described.

Figure 9:
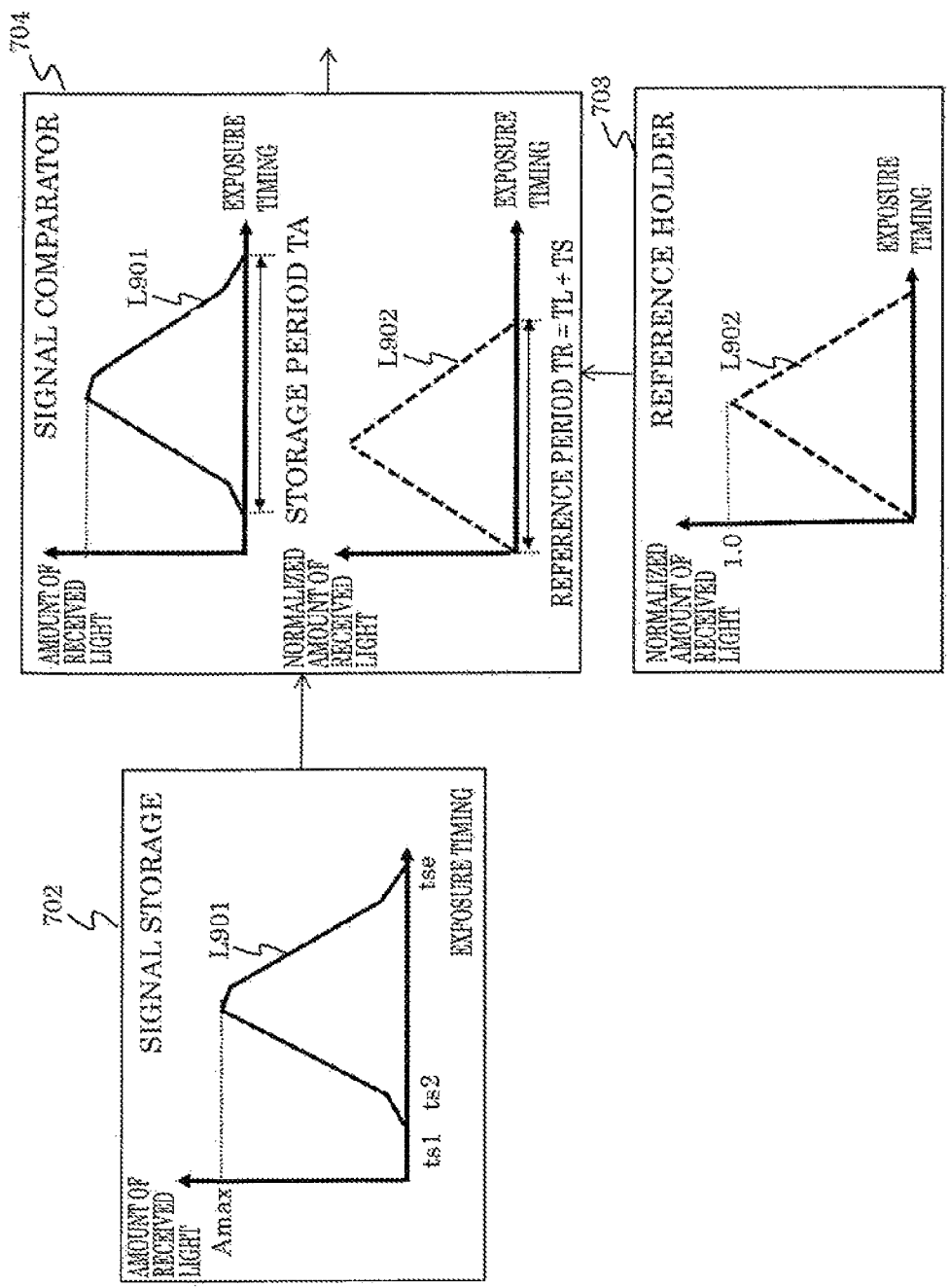
FIG. 9 is an explanatory diagram for multipath detection in a first operation example of a multipath detector according to Embodiment 1.

FIG. 9 is an explanatory diagram for multipath detection in the first operation example of the multipath detector according to Embodiment 1. In FIG. 9, the amount of received light and the normalized amount of received light are represented by straight lines; these may be only a set of points or may include data generated between points using the linear interpolation if the points are sparse.

Signal storage 702 includes polygonal line L901 in which the amount of received light is stored at each timing from the first through N-th pairs indicated by timing indicator 701. Signal storage 702 measures maximum value Amax of the amount of received light at the same time.

Reference holder 703 stores the amount of received light at each timing indicated by timing indicator 701 under the condition of not being affected by multipath, and holds, as reference data, a reference table normalized with the maximum value of the amount of received light that has been stored. The reference data incudes polygonal line L902. The reference data is created in advance through measurement or simulations.

First, signal comparator 704 measures storage period TA which is the period from rising to falling of storage value L901. Second, signal comparator 704 measures reference period TR which is the period from rising to falling of polygonal line L902 in the reference table. Reference period TR may be separately held because at a point when the reference table is created, reference period TR can be determined by the following expression.

[Math. 8]

$$TR=TL+TS \qquad \text{Expression 8}$$

Third, signal comparator 704 compares storage period TA and reference period TR. When multipath arises, the pulse width of mix reflected light increases and, accordingly, storage period TA becomes longer than reference period TR; thus, when TA>TR, signal comparator 704 determines that there is multipath. Thus, multipath can be detected using a method in which the reference table free from the effects of multipath is held and the measured storage value is compared, meaning that processing load is small.

Note that the reference data may be data representing polygonal line L902 in FIG. 9 or may be the aforementioned reference period TR (=TL+TS). Reference period TR is determined according to the sum of pulse width TL of the emission pulse and pulse width TS of the exposure pulse.

The following describes calculation of a correction factor by correction factor calculator 705 when signal comparator 704 determines that multipath arises.

Figure 10:
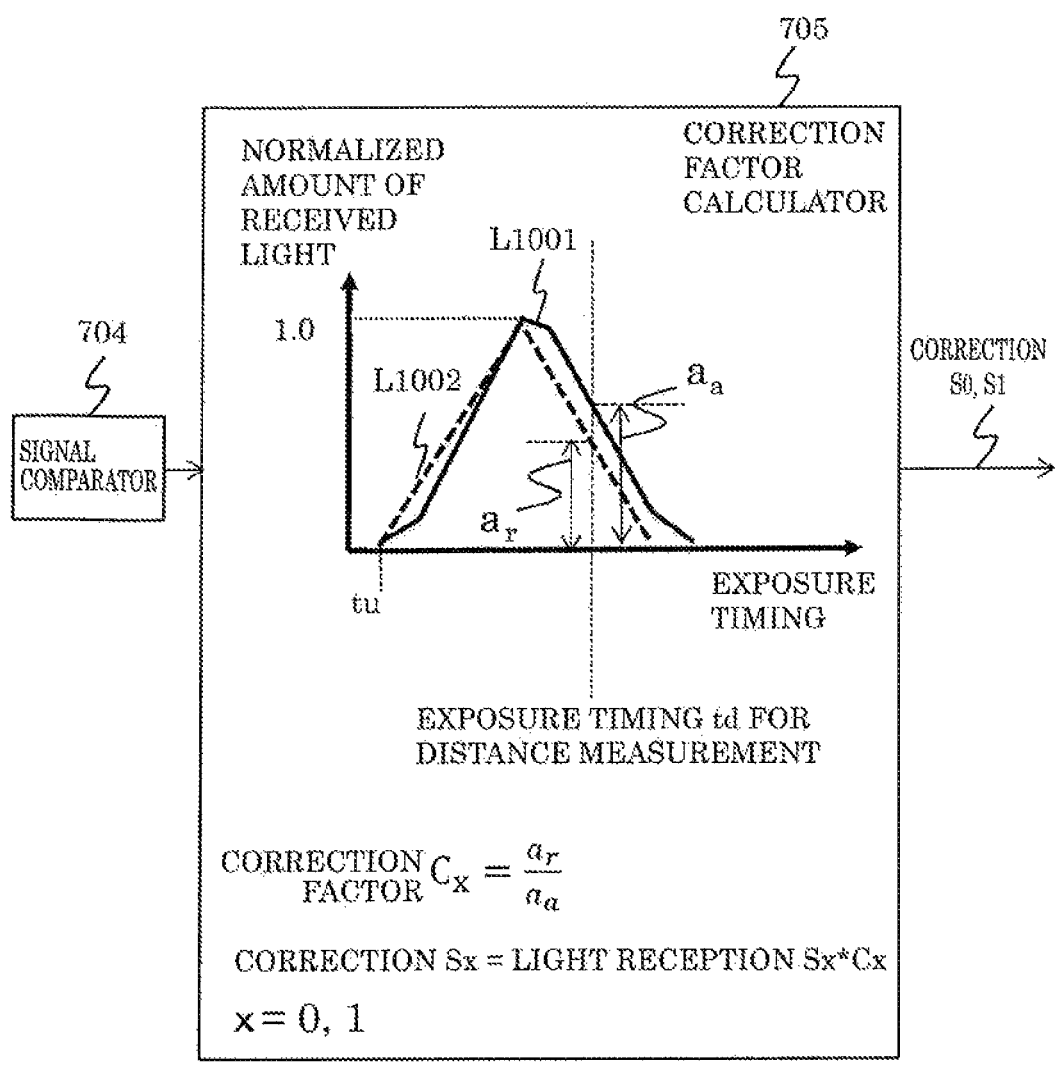
FIG. 10 illustrates a correction method in a first operation example of a multipath detector according to Embodiment 1.

FIG. 10 illustrates a correction method in the first operation example of multipath detector 111 according to Embodiment 1. When signal comparator 704 determines that there is multipath, correction factor calculator 705 calculates correction factor C by the correction method illustrated in FIG. 10. First, correction factor calculator 705 converts the data stored in signal storage 702 into the normalized amount of received light using maximum value Amax of the amount of received light. Specifically, storage value L901 becomes normalized storage value L1001. Second, correction factor calculator 705 detects rising tu of normalized storage value L1001 and converts reference table L902 into reference table L1002 by matching the rising timing in reference table L902 to tu. Third, correction factor calculator 705 calculates normalized storage value $a_a$ and reference value $a_r$ at the point of exposure timing is determined for distance measurement. Correction factor C for correcting the storage value to obtain a value free from multipath is calculated as follows.

[Math. 9]

$$C=a_r/a_a \qquad \text{Expression 9}$$

With correction factor C, an amount of received light that is erroneously $a_a/a_r$ times due to multipath can be recovered to a proper amount of received light that is free from multipath.

In order to convert amounts S0, S1 of light received at exposure timing td for distance measurement into corrected amounts S_C0, S_C1 of received light from which multipath components have been removed, the correction is performed using the following expressions.

[Math. 10]

$$S\_C0=C\_0 \times S0 \qquad \text{Expression 10}$$

[Math. 11]

$$S\_C1=C\_1 \times S1 \qquad \text{Expression 11}$$

For correction factor C_0 and correction factor C_1, there are two types of the exposure timing for distance measurement in the case of the ToF method (I) illustrated in FIG. 2 and FIG. 5, and thus correction factor C_0 and correction factor C_1 are calculated according to Expression 9 at the respective points of the two types of the exposure timing for distance measurement.

Distance calculator 112 calculates a distance on the basis of the signal corrected using the correction factor output from multipath detector 111. This makes it possible to obtain a distance image having high distance accuracy in a light-load correction method.

[1.4 Second Operation Example of Multipath Detection]

Next, regarding distance information acquisition device 100 according to Embodiment 1, the second operation example of multipath detection will be described.

Figure 11A:
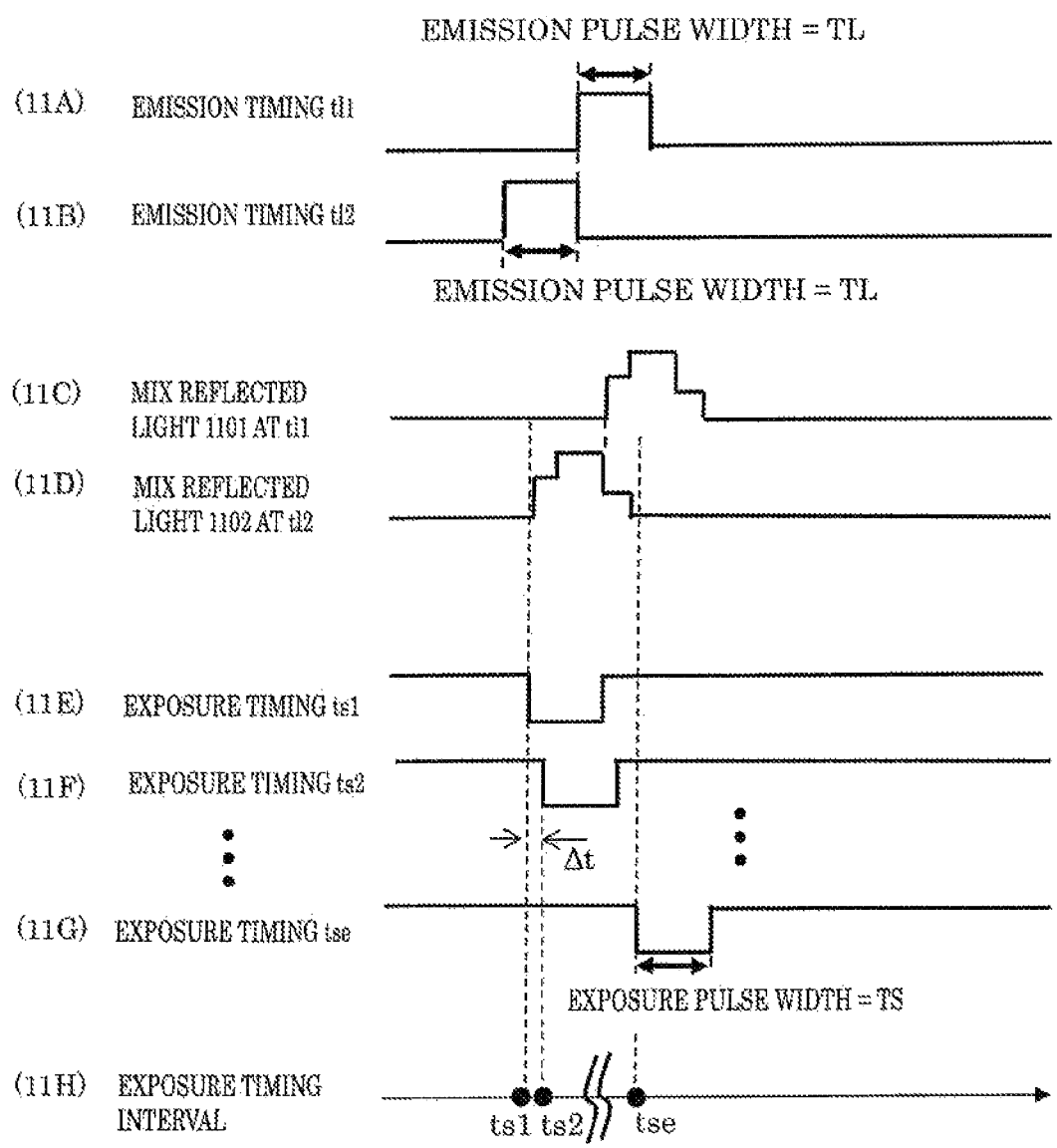
FIG. 11A illustrates a second operation example of emission and exposure timings in a multipath detector according to Embodiment 1.

FIG. 11A illustrates the second operation example of emission and exposure timings in the multipath detector according to Embodiment 1.

First, the signal waveforms illustrated in (11A) to (11G) in FIG. 11A will be described. The signal waveforms illustrated in (11A) to (11G) are not necessarily limited to waveforms on the same time axis and are illustrated to include waveforms on different time axes for convenience of description.

(11A) illustrates an emission pulse included in an emission control signal serving as the timing signal generated by timing indicator 701 or irradiation light from light source 115 based on the emission pulse. The timing of the irradiation light or the emission pulse is denoted as emission timing tl1. The pulse width of the emission pulse or the pulse width of the irradiation light is denoted as TL. This emission pulse represents a half of N emission pulses included in N pairs ranging from the first through N-th pairs indicated by timing indicator 701 (for example, N/2 emission pulses in the odd-numbered pairs).

(11B) illustrates an emission pulse included in an emission control signal serving as the timing signal generated by timing indicator 701 or irradiation light from light source 115 based on the emission pulse. The timing of the irradiation light or the emission pulse is denoted as emission timing tl2. The pulse width of the emission pulse or the pulse width of the irradiation light is denoted as TL. The emission pulse is active-high, meaning ON in the high level period and OFF in the low level period. This emission pulse represents the remaining half of the N emission pulses other than those in (11A) (for example, N/2 emission pulses in the even-numbered pairs).

(11C) schematically illustrates one example of mix reflected light including directly reflected light and indirectly reflected light from object OBJ irradiated with the irradiation light in (11A).

(11D) schematically illustrates one example of mix reflected light including directly reflected light and indirectly reflected light from object OBJ irradiated with the irradiation light in (11B).

(11E) illustrates an exposure pulse included in an exposure control signal serving as the timing signal generated by timing indicator 701 and represents, for example, the exposure pulse in the first pair and the exposure pulse in the second pair. The timing of the exposure pulse is denoted as exposure timing ts1. The pulse width of the exposure pulse is denoted as TS.

(11F) illustrates an exposure pulse included in an exposure control signal serving as the timing signal generated by timing indicator 701 and represents, for example, the exposure pulse in the third pair and the exposure pulse in the fourth pair. The timing of the exposure pulse is denoted as exposure timing ts2. The pulse width of the exposure pulse is denoted as TS.

(11G) illustrates an exposure pulse included in an exposure control signal serving as the timing signal generated by timing indicator 701 and represents, for example, the exposure pulse in the (N−1)-th pair and the exposure pulse in the N-th pair. The timing of the exposure pulse is denoted as exposure timing tse. The pulse width of the exposure pulse is denoted as TS.

(11H) illustrates the interval between the start timings of the exposure pulses. Exposure timing ts1, which corresponds to the first pair and the second pair for exposure that is performed at different times in actuality, is handled as the same timing for the sake of convenience to store the received light signals into signal storage 702. Similarly, exposure timings ts2, . . . , tse also correspond to two pairs of exposure.

In FIG. 11A, there is time difference Δt between the start timings of exposure pulses in odd-numbered pairs. There is time difference Δt between the start timings of exposure pulses in even-numbered pairs. An odd-numbered pair and the next even-numbered pair are regarded as having the same exposure timing for the sake of convenience.

Among the plurality of pairs indicated in the timing signal generated by timing indicator 701, for example, the first pair corresponds to (11A, 11E). The second pair corresponds to (11B, 11E). The third pair corresponds to (11A, 11F). The fourth pair corresponds to (11B, 11F). Similarly, the (N−1)-th pair corresponds to (11A, 11G). The N-th pair corresponds to (11B, 11G).

Timing indicator 701 generates a timing signal indicating a time series from the first through N-th pairs or from the N-th through first pairs, and outputs the timing signal to emission/exposure controller 101.

Figure 11B:
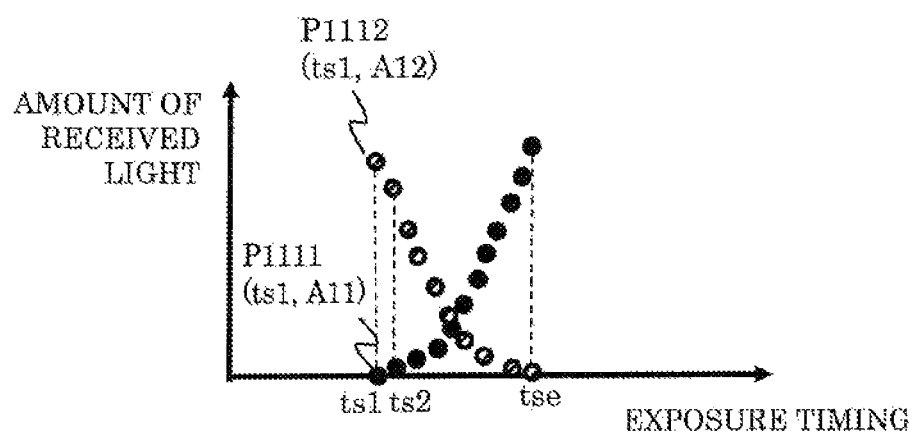
FIG. 11B illustrates one example of a sequence of received light signals in a second operation example of a multipath detector according to Embodiment 1.

FIG. 11B illustrates one example of a sequence of received light signals in the second operation example of the multipath detector according to Embodiment 1. The sequence of received light signals is output from solid-state imaging element 102 by emission and exposure that correspond to each of the plurality of pairs ranging from the first through N-th pairs, and is stored in signal storage 702. An odd-numbered pair (the closed circle in this figure) and the next even-numbered pair (the open circle in this figure) are plotted as the same exposure timing for the sake of convenience.

The horizontal axis in FIG. 11B represents the time axis and corresponds to the exposure timing interval in (11H). The vertical axis in FIG. 11B represents the amount of received light that is the amount of signal charge generated at a pixel by exposure. Point P1111 plotted in this figure corresponds to the first pair, meaning that (the exposure timing, the amount of received light) is (ts1, A11). Point P1112 plotted in this figure corresponds to the second pair, meaning that (the exposure timing, the amount of received light) is (ts1, A12).

Furthermore, one example of a timing indication method performed by timing indicator 701 using the ToF method (II) in the second operation example in FIG. 11A will be specifically described. Timing indicator 701 indicates, for emission/exposure controller 101, emission timing tl1 and emission pulse width TL of the irradiation light and exposure timing ts1 and exposure pulse width TS for solid-state imaging element 102 as timings in the first pair. Exposure timing ts1 is set to a point earlier than the reflection timing of fast-returning reflected light of mix reflected light 1101 including a multipath component corresponding to the irradiation light from light emitter 104 according to emission pulse width TL and emission timing tl1. In FIG. 11A, since mix reflected light 1102 returns faster, a timing earlier than the reflection timing of mix reflected light 1102 is set. Amount A11 of received light in reflected light corresponding to the irradiation light at emission timing tl1 according to the settings of the timings in the first pair is stored in signal storage 702. Specifically, in signal storage 702, P1111 is plotted as exposure timing ts1 and amount A11 of received light with the exposure timing on the horizontal axis and the amount of received light on the vertical axis.

Timing indicator 701 indicates, for emission/exposure controller 101, emission timing tl2 and emission pulse width TL of the irradiation light and exposure timing ts1 and exposure pulse width TS for solid-state imaging element 102 as timings in the second pair. Exposure timing ts1 is set to a point earlier than the reflection timing of fast-returning reflected light of mix reflected light 1102 including a multipath component corresponding to the irradiation light from light emitter 104 according to emission pulse width TL and emission timing tl2. In FIG. 11A, since mix reflected light 1102 returns faster, a timing earlier than the reflection timing of mix reflected light 1102 is set. Amount A12 of received light in reflected light corresponding to the irradiation light at emission timing tl2 according to the settings of the timings in the second pair is stored in signal storage 702. Specifically, in signal storage 702, P1112 is plotted as exposure timing ts1 and amount A12 of received light with the exposure timing on the horizontal axis and the amount of received light on the vertical axis.

The change in the exposure timing is repeated (N−1) times. As the timings in the n-th pair where n is an odd number, emission timing tl1 and emission pulse width TL of the irradiation light and exposure pulse width TS for solid-state imaging element 102, which are the same as the timing in the first pair, are indicated, and a change to exposure timing tsn, which is different from the timing in the first pair, is indicated. As the timings in the n-th pair where n is an even number, emission timing tl2 and emission pulse width TL of the irradiation light and exposure pulse width TS for solid-state imaging element 102, which are the same as the timing in the second pair, are indicated, and a change to exposure timing tsn, which is different from the timing in the second pair, is indicated. Exposure timing tsn corresponds to an odd-numbered pair and the next even-numbered pair and is represented by the following expression.

[Math. 12]

$$tsn = ts1 + n \times \Delta t \qquad \text{Expression 12}$$

Amounts An1, An2 of received light according to the settings of the timings in the n-th pair (an odd-numbered pair and the next even-numbered pair) is stored in signal storage 702. In signal storage 702, the graph is plotted as exposure timing tsn and amounts An1, An2 of received light.

Last exposure timing tse is set to a point later than the reflection timing of mix reflected light 1101, 1102 that returns faster. In FIG. 11A, it is sufficient that last exposure timings tse be set to a point later than the reflection timing of mix reflected light 1102. When the speed of light is denoted as c and the maximum distance measurement range is denoted as Dmax, it is sufficient that tse satisfy the following.

[Math. 13]

$$tse > 2 \times Dmax/c + TL \qquad \text{Expression 13}$$

Maximum distance measurement range Dmax represents the greatest distance the reflected light based on the irradiation light can be received.

Figure 11C:
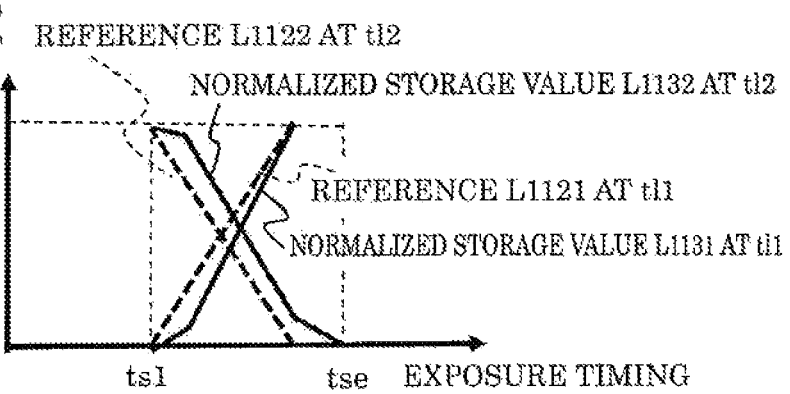
FIG. 11C illustrates reference data and one example of a normalized sequence of received light signals in a second operation example of a multipath detector according to Embodiment 1.

FIG. 11C illustrates reference data and one example of a normalized sequence of received light signals in the second operation example of the multipath detector according to Embodiment 1.

The relationship between a reference holding value and a storage value at the present timing is represented using reference table L1121 at emission timing tl1, reference table L1122 at emission timing tl2, normalized storage value L1131 at emission timing tl1, and normalized storage value L1132 at emission timing tl1. There is one type of exposure timing for distance measurement that is subject to correction factor calculation, i.e., td; using this type, correction factor C0 can be calculated from L1121 and L1131 and correction factor C1 can be calculated from L1122 and L1131 according to Expression 9.

[1.5 Third Operation Example of Multipath Detection]

Next, regarding distance information acquisition device 100 according to Embodiment 1, the third operation example of multipath detection will be described.

Figure 12A:
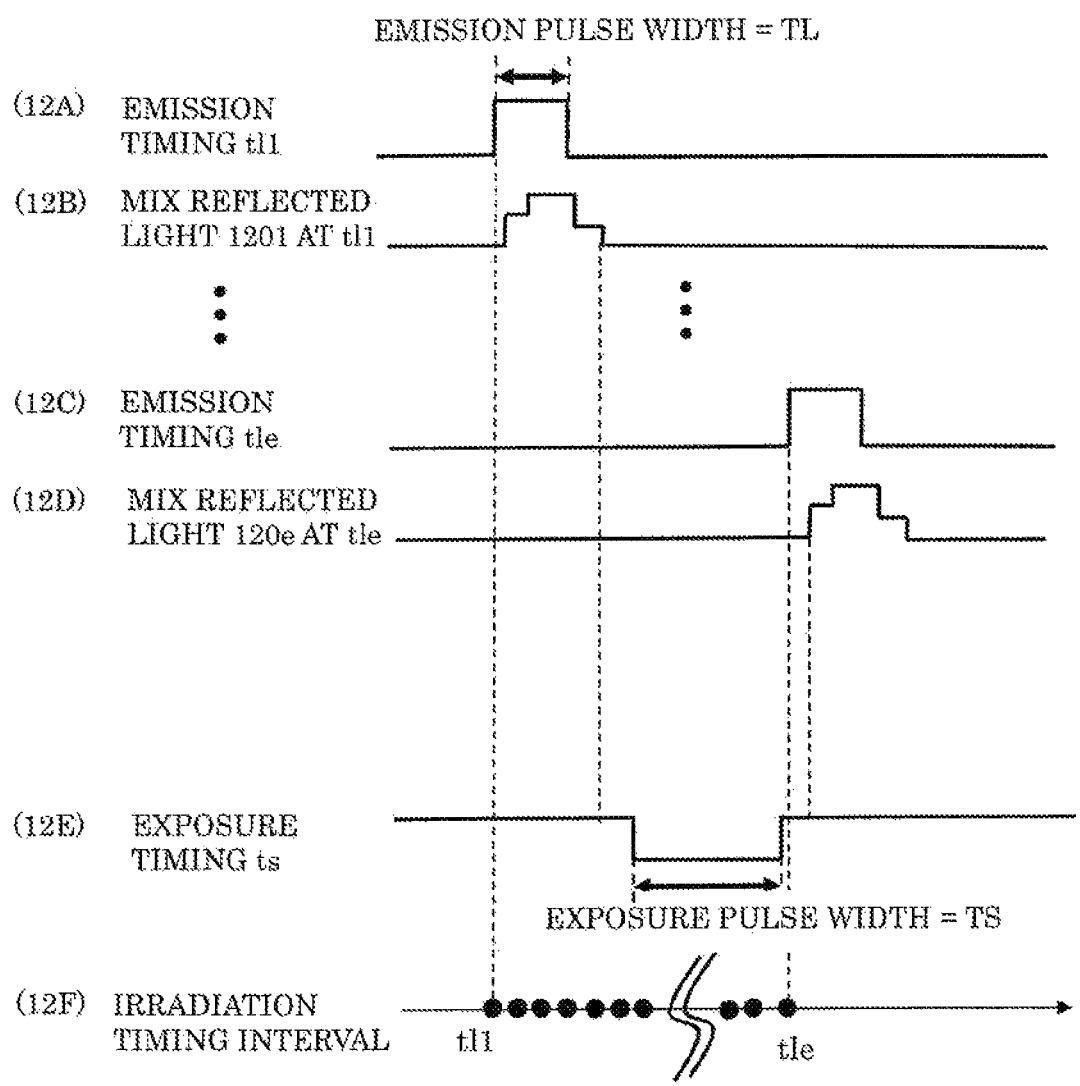
FIG. 12A illustrates a third operation example of emission and exposure timings in a multipath detector according to Embodiment 1.

FIG. 12A illustrates the third operation example of emission and exposure timings in the multipath detector according to Embodiment 1.

First, the signal waveforms illustrated in (12A) to (12F) in FIG. 12A will be described. The signal waveforms illustrated in (12A) to (12F) are not necessarily limited to waveforms on the same time axis and are illustrated to include waveforms on different time axes for convenience of description.

(12A) illustrates an emission pulse included in an emission control signal serving as the timing signal generated by timing indicator 701 or irradiation light from light source 115 based on the emission pulse. The timing of the irradiation light or the emission pulse is denoted as emission timing tl1. The pulse width of the emission pulse or the pulse width of the irradiation light is denoted as TL. This emission pulse represents the emission pulse included in the first pair indicated by timing indicator 701.

(12B) schematically illustrates one example of mix reflected light including directly reflected light and indirectly reflected light from object OBJ irradiated with the irradiation light in (12A).

(12C) illustrates an emission pulse included in an emission control signal serving as the timing signal generated by timing indicator 701 or irradiation light from light source 115 based on the emission pulse. The timing of the irradiation light or the emission pulse is denoted as emission timing tle. The pulse width of the emission pulse or the pulse width of the irradiation light is denoted as TL. This emission pulse represents the emission pulse included in the N-th pair indicated by timing indicator 701.

(12D) schematically illustrates one example of mix reflected light including directly reflected light and indirectly reflected light from object OBJ irradiated with the irradiation light in (12C).

(12E) illustrates an exposure pulse included in an exposure control signal serving as the timing signal generated by timing indicator 701 and represents, for example, the exposure pulses in the first through N-th pairs. The pulse width of the exposure pulse is denoted as TS.

(12F) illustrates the interval between the irradiation timings of the emission pulses. Emission timings tl1, . . . , tle, which correspond to the first pair, . . . , the N-th pair, are handled as timings for the sake of convenience to store the received light signals into signal storage 702.

In FIG. 12A, emission timings tl1, . . . , tle of the emission pulses in the first through N-th pairs are set to be gradually shifted relative to exposure timing is of the exposure pulse.

Among the plurality of pairs indicated in the timing signal generated by timing indicator 701, for example, the first pair corresponds to (12A, 12E). The N-th pair corresponds to (12C, 12E).

Timing indicator 701 generates a timing signal indicating a time series from the first through N-th pairs or from the N-th through first pairs, and outputs the timing signal to emission/exposure controller 101.

Figure 12B:
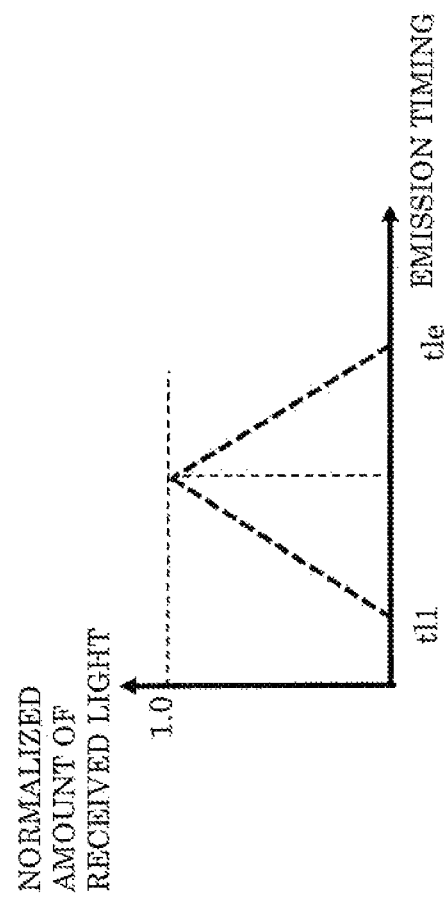
FIG. 12B illustrates one example of normalized reference data in a third operation example of a multipath detector according to Embodiment 1.

FIG. 12B illustrates one example of normalized reference data in the third operation example of the multipath detector according to Embodiment 1. The horizontal axis in this figure represents the time axis and corresponds to the irradiation timing interval in (12F). The vertical axis in this figure represents the normalized amount of received light at each of emission timings tl1, . . . , tle which corresponds to a multipath-free environment.

Furthermore, one example of an emission/exposure timing indication method performed by timing indicator 701 in the third operation example in FIG. 12A will be specifically described. This timing indication method is to sequentially change the exposure timing with respect to the emission timing in the plurality of pairs. Timing indicator 701 indicates, for emission/exposure controller 101, emission timing tl1 and emission pulse width TL of the irradiation light and exposure timing ts1 and exposure pulse width TS for solid-state imaging element 102 as timings in the first pair. Emission timing tl1 is set so that exposure timing ts1 is later than the reflection timing of mix reflected light 1201 including a multipath component corresponding to the irradiation light from light emitter 104 according to emission pulse width TL and emission timing tl1. Amount A1 of received light according to the settings of the timings in the first pair is stored in signal storage 702.

As the n-th timing, emission pulse width TL and emission timing tl1 of the irradiation light and exposure pulse width TS and exposure timing is for solid-state imaging element 102 are indicated. Emission timing tl1 is set so that exposure timing ts1 is later than the reflection timing of mix reflected light 120l including a multipath component corresponding to the irradiation light from light emitter 104 according to emission pulse width TL and emission timing tl1. Amount A1 of received light according to the settings of the first timing is stored in signal storage 702.

As the timings in the n-th pair, emission pulse width TL of the irradiation light and exposure timing is and exposure pulse width TS for solid-state imaging element 102, which are the same as the timing in the first pair, are indicated, and a change to emission timing tln, which is different from the timing in the first pair, is indicated. Exposure timing tin is represented by the following expression.

[Math. 14]

$$tln = tl1 + \Delta t \times n \quad \text{Expression 14}$$

Amount An of received light according to the settings of the timings in the n-th pair is stored in signal storage 702. In signal storage 702, the graph is plotted as emission timing tln and amount An of received light.

Last emission timing tle is set so that the reflection timing of mix reflected light 120e is later than the exposure timing. When the speed of light is denoted as c and the maximum distance measurement range is denoted as Dmax, it is sufficient that tie satisfy the following.

[Math. 15]

$$tle > 2 \times Dmax/c + TS \quad \text{Expression 15}$$

Maximum distance measurement range Dmax represents the greatest distance the reflected light based on the irradiation light can be received.

Note that the correction factor in the third operation example is calculated according to Expression 9 as in FIG. 10.

Next, correction made in the above first to third operation examples when the irradiation light and the reflected light have waveform rounding will be described.

Figure 13:
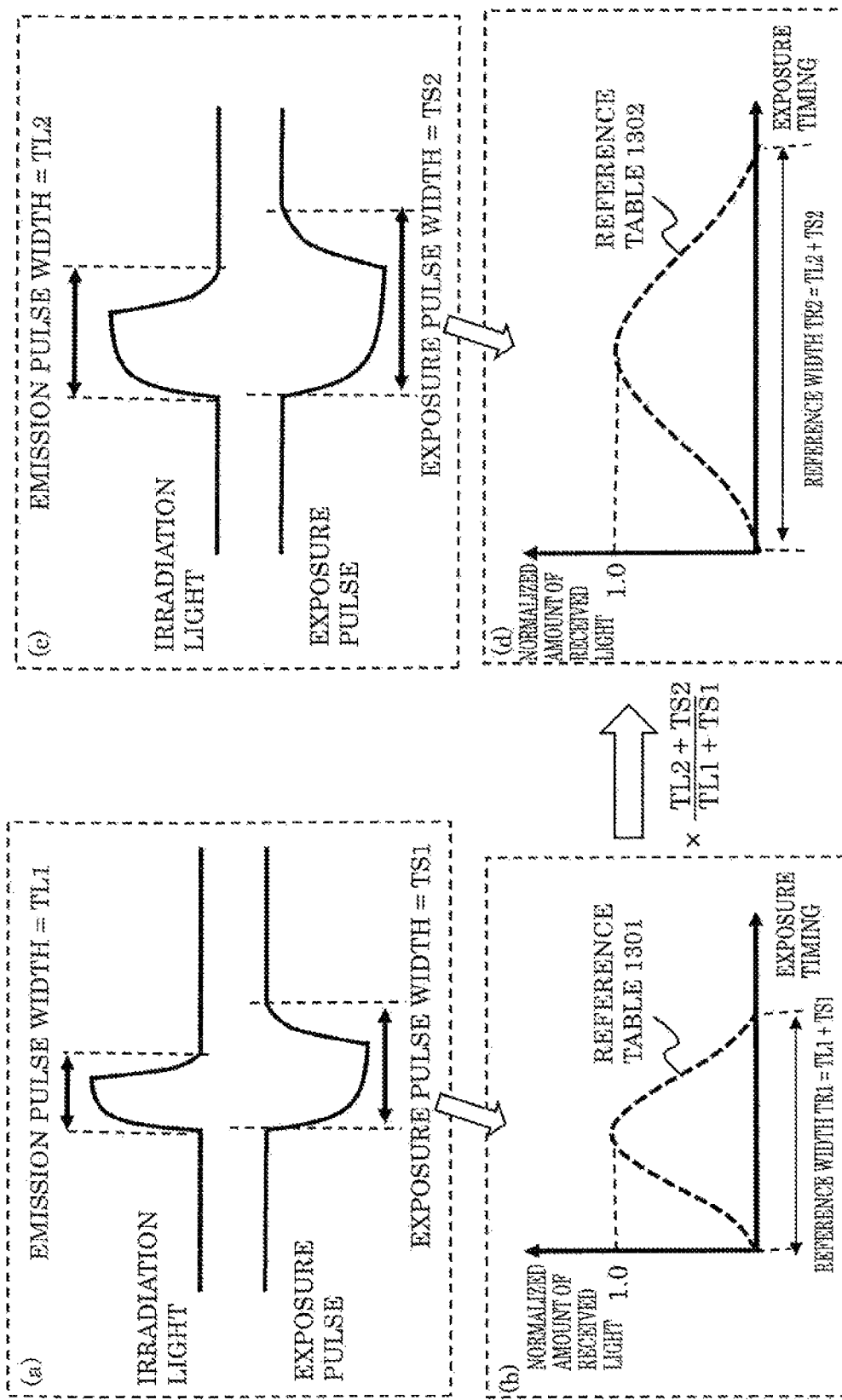
FIG. 13 is an explanatory diagram illustrating correction to be made on pulse waveforms having waveform rounding.

FIG. 13 is an explanatory diagram illustrating correction to be made on pulse waveforms having waveform rounding. The pulse waveforms have been thus far described as being rectangular waves, but waveforms in actual devices have rounded corners such as those in (a) and (c) in FIG. 13, for example. Even with such waveforms having rounded corners, it is possible to perform the multipath detection operation and the distance measurement operation. For example, reference table (that is, reference data) 1301 in (b) in FIG. 13 is obtained, and calculation can be performed according to the following: reference width TR1=TL1+TS1. Furthermore, in the reference table, the reference value measured in advance can be scaled up or down. For example, when an original emission pulse width is TL1, an original exposure pulse width is TS1, a target emission pulse width is TL2, and a target exposure pulse width is TS2, the horizontal axis is scaled up or down as in (d) in FIG. 13 using the following correction expression.

[Math. 16]

$$(TL2 + TS2)/(TL1 + TS1) \quad \text{Expression 16}$$

Note that the reference table may be created in advance through measurement or may be created in advance through simulations of an environment free from indirectly reflected light using the plurality of pairs of emission and exposure in any of the first operation example to the third operation example.

As described above, distance information acquisition device 100 according to Embodiment 1 includes: light emitter 104 which emits light according to an emission pulse indicating emission; solid-state imaging element 102 which performs exposure according to an exposure pulse indicating exposure; emission/exposure controller 101 which generates a timing signal indicating a plurality of pairs of the emission pulse and the exposure pulse that have a time difference, the time difference being different in each of the plurality of pairs; and multipath detector 111 which obtains a sequence of received light signals from the solid-state imaging element by the emission and the exposure that correspond to each of the plurality of pairs, compares the sequence of received light signals that has been obtained and reference data created in advance as a model of a sequence of received light signals in a multipath-free environment, and determines the presence or absence of multipath according to a difference in a comparison result.

With this, it is possible to lessen processing load for detecting multipath and reduce costs.

Furthermore, a total number of the plurality of pairs may be six or more.

Furthermore, the time difference between the emission pulse and the exposure pulse in each of the plurality of pairs may differ by a fixed amount of time.

Furthermore, emission/exposure controller 101 may change the timing of the exposure pulse relative to the timing of the emission pulse in the plurality of pairs.

Furthermore, emission/exposure controller 101 may change the timing of the emission pulse relative to the timing of the exposure pulse in the plurality of pairs.

Furthermore, width TS of the exposure pulse may be greater than or equal to width TL of the emission pulse.

Furthermore, the plurality of pairs may include the first through N-th pairs (N is an integer), and emission/exposure controller 101 may generate the timing signal to cause the first through N-th pairs to be produced on a time-series basis.

Furthermore, the time difference between emission pulses in the plurality of pairs may be a fixed amount of time.

Furthermore, the multipath detector may include a reference data holder which holds the reference data, and the reference data may be a model of the sequence of received light signals in the multipath-free environment.

Furthermore, the multipath detector may include a reference data holder which holds the reference data, and the reference data may be a length of time determined according to the sum of pulse width TL of the emission pulse and pulse width TS of the exposure pulse.

Furthermore, when the multipath detector determines that the multipath is present, the multipath detector may further calculate a correction factor for each pixel.

Furthermore, the multipath detector may calculate the correction factor according to a comparison result indicating the ratio between the sequence of received light signals and the reference data.

Moreover, multipath detection device 110 according to Embodiment 1 detects multipath using a light emitter which emits light according to an emission pulse indicating emission and a solid-state imaging element which performs exposure according to an exposure pulse indicating exposure. Multipath detection device 110 includes: emission/exposure controller 101 which generates a timing signal indicating a plurality of pairs of the emission pulse and the exposure pulse that have a time difference, the time difference being different in each of the plurality of pairs; and multipath detector 111 which obtains a sequence of received light signals from the solid-state imaging element by the emission and the exposure that correspond to each of the plurality of pairs, compares the sequence of received light signals that has been obtained and reference data created in advance as a model of a sequence of received light signals in a multipath-free environment, and determines the presence or absence of multipath according to a difference in a comparison result.

Moreover, the multipath detection method according to Embodiment 1 is to detect multipath using a light emitter which emits light according to an emission pulse indicating emission and a solid-state imaging element which performs exposure according to an exposure pulse indicating exposure. The multipath detection method includes: generating a timing signal indicating a plurality of pairs of the emission pulse and the exposure pulse that have a time difference, the time difference being different in each of the plurality of pairs; obtaining a sequence of received light signals from the solid-state imaging element by the emission and the exposure that correspond to each of the plurality of pairs; comparing the sequence of received light signals that has been obtained and reference data created in advance as a model of a sequence of received light signals in a multipath-free environment; and determining the presence or absence of multipath according to a difference in a comparison result.

With the above-described multipath detection device and method, it is possible to lessen processing load for detecting multipath and reduce costs.

Embodiment 2

Next, distance information acquisition device 100 according to Embodiment 2 will be described. Embodiment 1 describes an example in which the multipath detection operation and the normal distance measurement operation are performed at different timings. In contrast, Embodiment 2 describes an example in which the multipath detection operation and the normal distance measurement operation can be performed at the same time.

[2.1 Configuration Example of Distance Information Acquisition device 100]

Distance information acquisition device 100 according to Embodiment 2 may have the same configuration as that illustrated in FIG. 7A and FIG. 7B. However, the operation of multipath detector 111 is slightly different. The following description will be centered on the points of difference.

[2.2 First Operation Example of Multipath Detection Operation and Distance Measurement Operation]

First, the first operation example of distance information acquisition device 100 according to Embodiment 2 in which the multipath detection operation and the distance measurement operation are performed at the same time will be described.

Figure 14A:
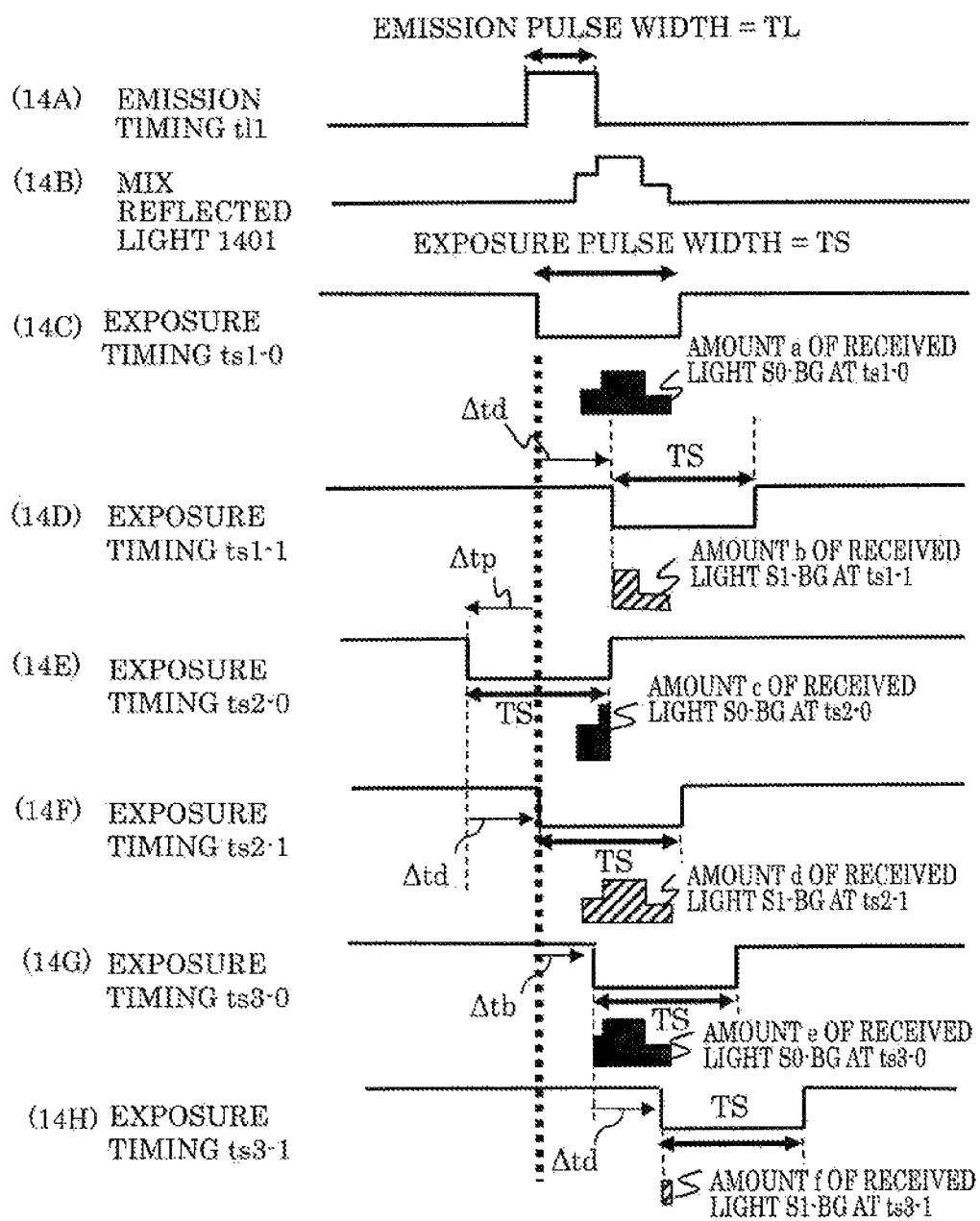
FIG. 14A illustrates a first operation example of a multipath detector according to Embodiment 2.

FIG. 14A illustrates the first operation example of multipath detector 111 according to Embodiment 2. FIG. 14B illustrates one example of a sequence of received light signals in the first operation example of the multipath detector according to Embodiment 2. Amount a of received light to amount f of received light in these figures respectively correspond to the first through sixth pairs, for example.

First, the signal waveforms illustrated in (14A) to (14H) in FIG. 14A will be described. The signal waveforms illustrated in (14A) to (14H) are not necessarily limited to waveforms on the same time axis and are illustrated to include waveforms on different time axes for convenience of description. This figure shows a case where there are six pairs as the plurality of pairs of the emission pulse and the exposure pulse that range from the first through N-th pairs.

(14A) illustrates an emission pulse included in an emission control signal serving as the timing signal generated by timing indicator 701 or irradiation light from light source 115 based on the emission pulse. The timing of the irradiation light or the emission pulse is denoted as emission timing tl1. The pulse width of the emission pulse or the pulse width of the irradiation light is denoted as TL. This emission pulse represents an emission pulse included in each of the first through sixth pairs indicated by timing indicator 701.

(14B) schematically illustrates one example of mix reflected light including directly reflected light and indirectly reflected light from object OBJ irradiated with the irradiation light in (14A).

(14C) illustrates an exposure pulse included in an exposure control signal serving as the timing signal generated by timing indicator 701 and represents, for example, the exposure pulse in the first pair. The pulse width of the exposure pulse is denoted as TS, and the exposure timing is denoted as ts1-0.

(14D) illustrates an exposure pulse included in an exposure control signal serving as the timing signal generated by timing indicator 701 and represents, for example, the exposure pulse in the second pair. The pulse width of the exposure pulse is denoted as TS, and the exposure timing is denoted as ts1-1.

(14E) illustrates an exposure pulse included in an exposure control signal serving as the timing signal generated by timing indicator 701 and represents, for example, the exposure pulse in the third pair. The pulse width of the exposure pulse is denoted as TS, and the exposure timing is denoted as ts2-0. Exposure timing ts2-0 is obtained by providing delay time −Δtp to exposure timing ts1-0 for distance measurement.

(14F) illustrates an exposure pulse included in an exposure control signal serving as the timing signal generated by timing indicator 701 and represents, for example, the exposure pulse in the fourth pair. The pulse width of the exposure pulse is denoted as TS, and the exposure timing is denoted as ts2-1.

(14G) illustrates an exposure pulse included in an exposure control signal serving as the timing signal generated by timing indicator 701 and represents, for example, the exposure pulse in the fifth pair. The pulse width of the exposure pulse is denoted as TS, and the exposure timing is denoted as ts3-0.

(14H) illustrates an exposure pulse included in an exposure control signal serving as the timing signal generated by timing indicator 701 and represents, for example, the exposure pulse in the sixth pair. The pulse width of the exposure pulse is denoted as TS, and the exposure timing is denoted as ts3-1.

Among the six pairs indicated by the timing signal generated by timing indicator 701, for example, the first pair corresponds to (14A, 14C), the second pair corresponds to (14A, 14D), the third pair corresponds to (14A, 14E), the fourth pair corresponds to (14A, 14F), the fifth pair corresponds to (14A, 14G), and the sixth pair corresponds to (14A, 14H).

Emission timing tl1 and exposure timing ts1-0 in FIG. 14A are the same timings as those in the "S0 exposure" in the ToF method (I) illustrated in FIG. 2 and are used in both the multipath detection operation and the distance measurement operation. Emission timing tl1 and exposure timing ts1-1 in FIG. 14A are the same timings as those in the "S1 exposure" in the ToF method (I) illustrated in FIG. 2 and are used in both the multipath detection operation and the distance measurement operation.

There is time difference $\Delta td$ between exposure timing ts1-0 for distance measurement and exposure timing ts1-1. Time difference $\Delta td$ means a shift amount for distance measurement.

Exposure timing ts2-0 has delay $-\Delta tp$ relative to exposure timing ts1-0 for distance measurement, and exposure timing ts2-1 has delay $-\Delta tp$ relative to exposure timing ts1-1 for distance measurement. Here, $-\Delta tp$ means a forward shift amount set for multipath detection relative to each of exposure timings ts1-0, ts1-1 for distance measurement.

Exposure timing ts3-0 has delay $+\Delta tb$ relative to exposure timing ts1-0 for distance measurement, and exposure timing ts3-1 has delay $+\Delta tb$ relative to exposure timing ts1-1 for distance measurement. Here, $+\Delta tb$ means a backward shift amount set for multipath detection relative to each of exposure timings ts1-0, ts1-1 for distance measurement.

Timing indicator 701 generates a timing signal indicating a time series from the first through sixth pairs or from the sixth through first pairs, and outputs the timing signal to emission/exposure controller 101. Note that the generation sequence for the first through sixth pairs may be arbitrary.

FIG. 14B illustrates one example of a sequence of received light signals in the first operation example of multipath detector 111 according to Embodiment 2. Amount a of received light to amount f of received light in this figure respectively correspond to the first through sixth pairs, for example. The sequence of received light signals in FIG. 14B is used in a multipath detection operation and correction factor calculation such as those in FIG. 11C and is also used in a distance measurement operation such as that according to the ToF method (I) in FIG. 2.

Furthermore, an example of a timing indication method according to the ToF method (I) performed by timing indicator 701 in the first operation example in FIG. 14A will be described. Timing indicator 701 indicates, for emission/exposure controller 101, emission timing tl1 and emission pulse width TL of the irradiation light and exposure timing ts1-0 and exposure pulse width TS for solid-state imaging element 102 as timings in the first pair. Furthermore, timing indicator 701 indicates, for emission/exposure controller 101, emission timing tl1 and emission pulse width TL of the irradiation light and exposure timing ts1-1 and exposure pulse width TS for solid-state imaging element 102 as timings in the second pair. Using shift amount $\Delta td$ required for distance measurement, exposure timings ts1-0, ts1-1 can be expressed as follows.

[Math. 17]

$$ts1\text{-}0 = ts1\text{-}1 + \Delta td \qquad \text{Expression 17}$$

Suppose mix reflected light 1401 including a multipath component corresponding to the irradiation light from light emitter 104 according to emission pulse width TL and emission timing tl1. Amount a of received light of a (S0-BG) signal at exposure timing ts1-0 of reflected light corresponding to the irradiation light at emission timing tl1 according to the settings of the timings in the first pair is stored in signal storage 702. Furthermore, amount b of received light of a (S1-BG) signal at exposure timing ts1-1 of reflected light corresponding to the irradiation light at emission timing tl1 according to the settings of the timings in the second pair is stored in signal storage 702. Specifically, as illustrated in FIG. 14B, in signal storage 702, the graph is plotted as exposure timing ts1, amount a of received light, and amount b of received light with the exposure timing on the horizontal axis and the amount of received light on the vertical axis.

Similarly, as the timings in the third pair, emission pulse width TL, emission timing tl1, and exposure pulse width TS for solid-state imaging element 102, which are the same as the timing in the first pair, and exposure timing ts2-0, which is different from the timing in the first pair, are indicated. Furthermore, as the timings in the fourth pair, emission pulse width TL, emission timing tl1, and exposure pulse width TS for solid-state imaging element 102, which are the same as the timing in the first pair, and exposure timing ts2-1, which is different from the timing in the first pair, are indicated. Using forward shift amount $\Delta tp$ for multipath detection, exposure timing ts2-0 and exposure timing ts2-1 are calculated according to the following relational expression.

[Math. 18]

$$ts2\text{-}0 = ts1\text{-}0 - \Delta tp \qquad \text{Expression 18-1}$$

$$ts2\text{-}1 = ts2\text{-}0 + \Delta td \qquad \text{Expression 18-2}$$

As $\Delta tp$, a fixed value may be used, or an optimal shift amount may be calculated from the values of amounts a, b of received light. Amount c of received light of a (S0-BG) signal at exposure timing ts2-0 of reflected light corresponding to the irradiation light at emission timing tl1 according to the settings of the timings in the third pair is stored in signal storage 702. Furthermore, amount d of received light of a (S1-BG) signal at exposure timing ts2-1 of reflected light corresponding to the irradiation light at emission timing tl1 according to the settings of the timings in the fourth pair is stored in signal storage 702. Specifically, as illustrated in FIG. 14B, in signal storage 702, the graph is plotted as exposure timing ts2, amount c of received light, and amount d of received light.

Next, as the timings in the fifth pair, emission pulse width TL, emission timing tl1, and exposure pulse width TS for solid-state imaging element 102, which are the same as the timing in the first pair, and exposure timing ts3-0, which is different from the timing in the first pair, are indicated. Furthermore, as the timings in the sixth pair, emission pulse width TL, emission timing tl1, and exposure pulse width TS for solid-state imaging element 102, which are the same as the timing in the first pair, and exposure timing ts3-1, which is different from the timing in the first pair, are indicated. Using backward shift amount $\Delta tb$ for multipath detection, exposure timing ts3-0 and exposure timing ts3-1 are calculated according to the following relational expression.

[Math. 19]

$$ts3\text{-}0 = ts1\text{-}0 + \Delta tb \qquad \text{Expression 19-1}$$

$$ts3\text{-}1 = ts2\text{-}0 + \Delta td \qquad \text{Expression 19-2}$$

As $\Delta tb$, a fixed value may be used, or an optimal shift amount may be calculated from the values of amounts a, b of received light. Amount e of received light of a (S0-BG) signal at exposure timing ts3-0 of reflected light corresponding to the irradiation light at emission timing tl1 according to the settings of the timings in the fifth pair is stored in signal storage 702. Furthermore, amount f of received light of a (S1-BG) signal at exposure timing ts3-1 of reflected light corresponding to the irradiation light at emission timing tl1 according to the settings of the timings in the sixth pair is stored in signal storage 702. Specifically, in signal storage 702, the graph is plotted as exposure timing ts3, amount e of received light, and amount f of received light.

Multipath detector 111 compares the sequence of received light signals in FIG. 14B and the reference data, and determines, for each pixel, the presence or absence of multipath according to a difference in the comparison result. Furthermore, using the sequence of received light signals in FIG. 14B, distance calculator 112 calculates a distance for each pixel according to the ToF method (I). At this time, when multipath detector 111 determines that multipath is present, correction factor calculator 705 calculates a correction factor according to Expression 26 and Expression 28 in the second operation examples to be described later. Although the distance measurement operation according to the ToF method (I) has been thus far described with reference to FIG. 14A, the ToF method (II) may also be used.

[2.3 Second Operation Example of Multipath Detection Operation and Distance Measurement Operation]

Next, the second operation example of distance information acquisition device 100 according to Embodiment 2 in which the multipath detection operation and the distance measurement operation are performed at the same time will be described.

Figure 15A:
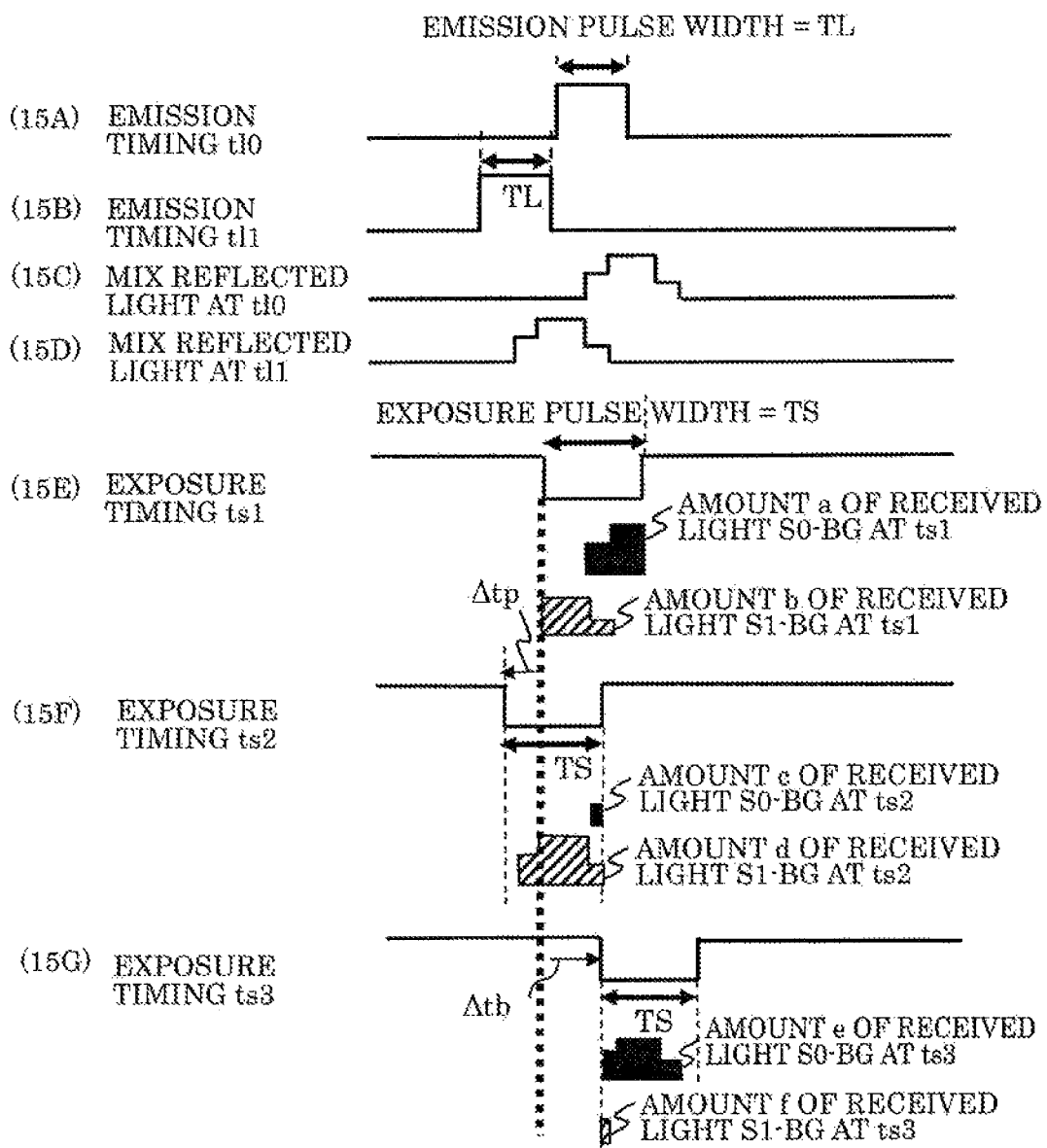
FIG. 15A illustrates a second operation example of a multipath detector according to Embodiment 2.
Figure 15B:
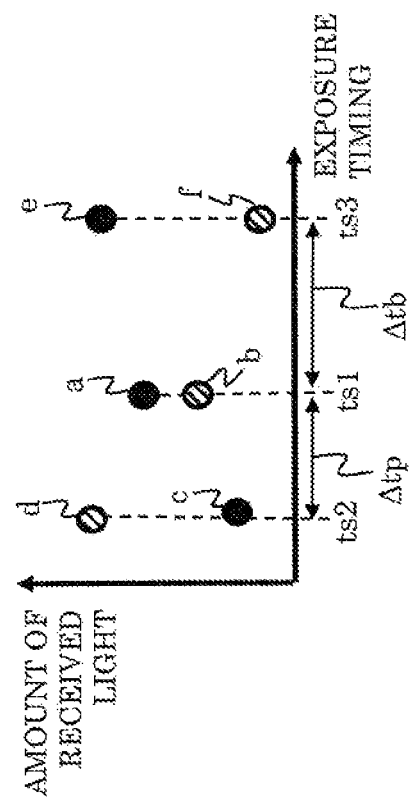
FIG. 15B illustrates one example of a sequence of received light signals in a second operation example of a multipath detector according to Embodiment 2.

FIG. 15A illustrates the second operation example of multipath detector 111 according to Embodiment 2. FIG. 15B illustrates one example of a sequence of received light signals in the second operation example of the multipath detector according to Embodiment 2. Amount a of received light to amount f of received light in these figures respectively correspond to the first through sixth pairs, for example.

First, the signal waveforms illustrated in (15A) to (15G) in FIG. 15A will be described. The signal waveforms illustrated in (15A) to (15G) are not necessarily limited to waveforms on the same time axis and are illustrated to include waveforms on different time axes for convenience of description. This figure shows a case where there are six pairs as the plurality of pairs of the emission pulse and the exposure pulse that range from the first through N-th pairs.

(15A) illustrates an emission pulse or irradiation light. The timing of the irradiation light or the emission pulse is denoted as emission timing tl0. The pulse width of the emission pulse or the pulse width of the irradiation light is denoted as TL. This emission pulse represents an emission pulse included in each of the first pair, the third pair, and the fifth pair indicated by timing indicator 701, for example.

(15B) illustrates an emission pulse or irradiation light. The timing of the irradiation light or the emission pulse is denoted as emission timing tl1. The pulse width of the emission pulse or the pulse width of the irradiation light is denoted as TL. This emission pulse represents an emission pulse included in each of the second pair, the fourth pair, and the sixth pair indicated by timing indicator 701, for example.

(15C) schematically illustrates one example of mix reflected light including directly reflected light and indirectly reflected light from object OBJ irradiated with the irradiation light in (15A).

(15D) schematically illustrates one example of mix reflected light including directly reflected light and indirectly reflected light from object OBJ irradiated with the irradiation light in (15B).

(15E) represents the exposure pulse in the first pair and the second pair, for example. The pulse width of the exposure pulse is denoted as TS, and the exposure timing is denoted as ts1. The exposure pulses in the first pair and the second pair correspond to, for example, amounts a, b of received light. Amount a of received light corresponds to a (S0-BG) signal of the amount of received light at exposure timing ts1 in S0 exposure according to the ToF method (II). Amount b of received light corresponds to a (S1-BG) signal of the amount of received light at exposure timing ts1 in S1 exposure according to the ToF method (II).

(15F) represents the exposure pulse in the third pair and the fourth pair, for example. The pulse width of the exposure pulse is denoted as TS, and the exposure timing is denoted as ts2. The exposure pulses in the third pair and the fourth pair correspond to, for example, amounts c, d of received light. Amount c of received light corresponds to a (S0-BG) signal of the amount of received light at exposure timing ts2 in S0 exposure according to the ToF method (II). Amount d of received light corresponds to a (S1-BG) signal of the amount of received light at exposure timing ts2 in S1 exposure according to the ToF method (II).

(15G) represents the exposure pulse in the fifth pair and the sixth pair, for example. The pulse width of the exposure pulse is denoted as TS, and the exposure timing is denoted as ts3. The exposure pulses in the fifth pair and the sixth pair correspond to, for example, amounts e, f of received light. Amount e of received light corresponds to a (S0-BG) signal of the amount of received light at exposure timing ts3 in S0 exposure according to the ToF method (II). Amount f of received light corresponds to a (S1-BG) signal of the amount of received light at exposure timing ts3 in S1 exposure according to the ToF method (II).

Among the six pairs indicated by the timing signal generated by timing indicator 701, for example, the first pair corresponds to (15A, 15E), the second pair corresponds to (15B, 15E), the third pair corresponds to (15A, 15F), the fourth pair corresponds to (15B, 15F), the fifth pair corresponds to (15A, 15G), and the sixth pair corresponds to (15B, 15G).

Emission timing tl0 and exposure timing ts1 in FIG. 15A are the same timings as those in the "S0 exposure" in the ToF method (II) illustrated in FIG. 3 and are used in both the multipath detection operation and the distance measurement operation. Emission timing tl1 and exposure timing ts1 are the same timings as those in the "S1 exposure" in the ToF method (II) illustrated in FIG. 3 and are used in both the multipath detection operation and the distance measurement operation.

Exposure timing ts2 has delay $-\Delta tp$ relative to exposure timing ts1 for distance measurement. Here, $-\Delta tp$ means a forward shift amount set for multipath detection relative to exposure timing ts1 for distance measurement.

Exposure timing ts3 has delay $+\Delta tb$ relative to exposure timing ts1 for distance measurement. Here, $+\Delta tb$ means a backward shift amount set for multipath detection relative to exposure timing ts1 for distance measurement.

Timing indicator 701 generates a timing signal indicating a time series from the first through sixth pairs or from the sixth through first pairs, and outputs the timing signal to emission/exposure controller 101. Note that the generation sequence for the first through sixth pairs may be arbitrary.

FIG. 15B illustrates one example of a sequence of received light signals in the second operation example of multipath detector 111 according to Embodiment 2. Amount a of received light to amount f of received light in this figure respectively correspond to the first through sixth pairs, for example. The sequence of received light signals in FIG. 15B is used in a multipath detection operation and correction factor calculation such as those in FIG. 11C and is also used in a distance measurement operation such as that in the ToF method (I) in FIG. 2.

The above second operation example according to Embodiment 2 allows for faster multipath detection operation as a result of using both the multipath detection operation and the distance measurement operation and thus is suitable for real-time processing.

Furthermore, the timing indication method performed by timing indicator 701 in the second operation example in FIG. 15A will be described. In order to indicate the first through sixth pairs, timing indicator 701 indicates combinations of emission timings tl0, tl1 and exposure timings ts1, ts2, ts3 in the ToF method (II). Amounts a, b, c, d, e, f of received light based on the first through sixth pairs are obtained and stored in signal storage 702. The relational expressions for exposure timings ts1, ts2, ts3 are Expression 17, Expression 18-2, and Expression 19-2.

Next, the multipath detection methods in the first operation example and the second operation example according to Embodiment 2 will be described.

Figure 16:
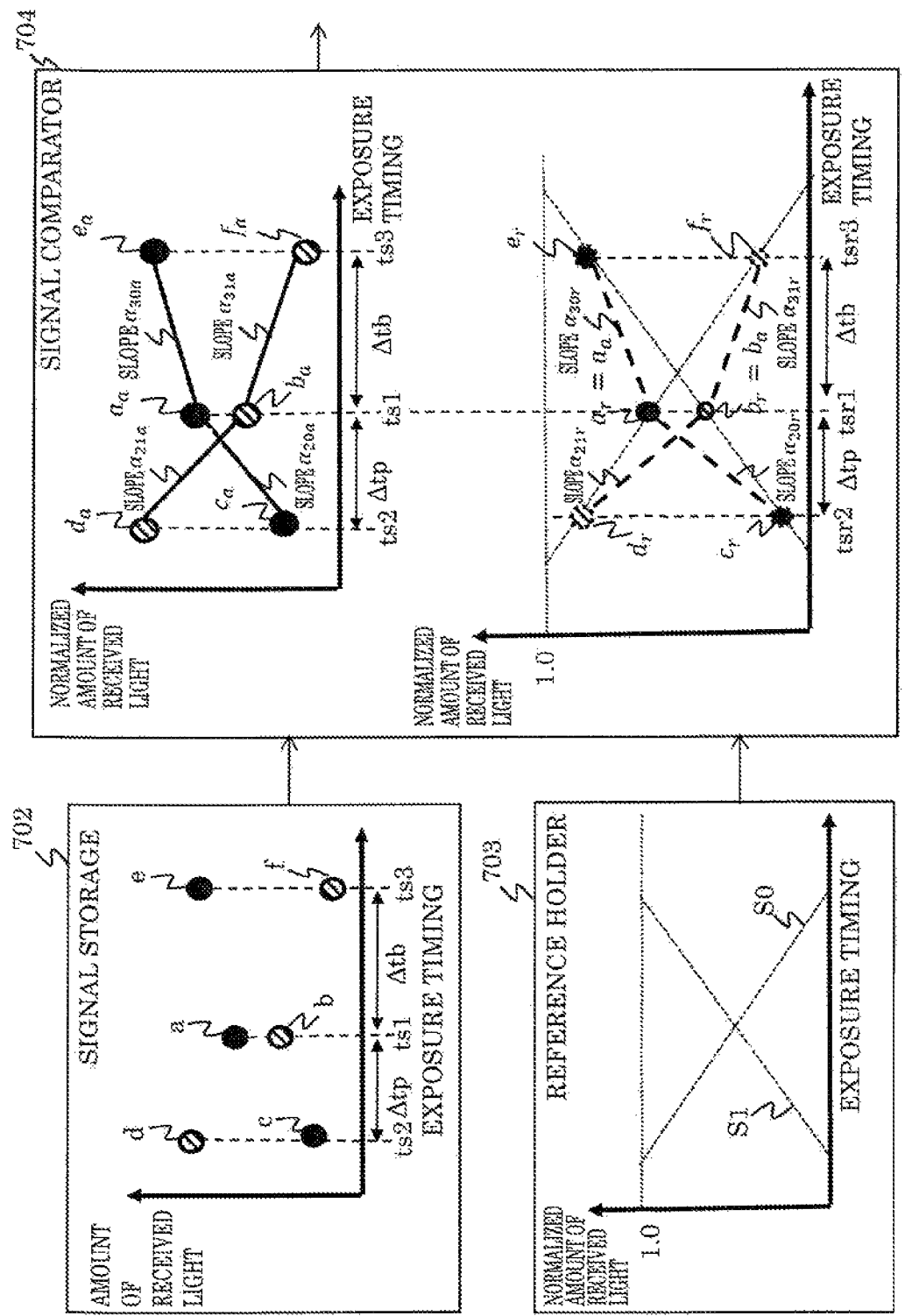
FIG. 16 is an explanatory diagram illustrating a multipath detection method performed by a multipath detector according to Embodiment 2.

FIG. 16 is an explanatory diagram illustrating the multipath detection method according to Embodiment 2. In signal storage 702 in FIG. 16, amounts a, b of received light at exposure timing ts1, amounts c, d of received light at exposure timing ts2, and amounts e, f of received light at exposure timing ts3 are stored as a signal storage result of timing indicator 701 illustrated in the first operation example in FIG. 14A and the second operation example in FIG. 15A. Reference holder 703 in FIG. 16 creates and holds a reference table (that is, reference data) in the same method as the reference table creation method according to Embodiment 1. In other word, data in which the exposure timing is sequentially shifted at specific intervals of shift amount Δt is held. The reference table makes it possible to detect multipath at high speed even when there are a small number of exposure timings. The multipath detection method performed by signal comparator 704 in FIG. 16 will be described with reference to FIG. 17.

Figure 17:
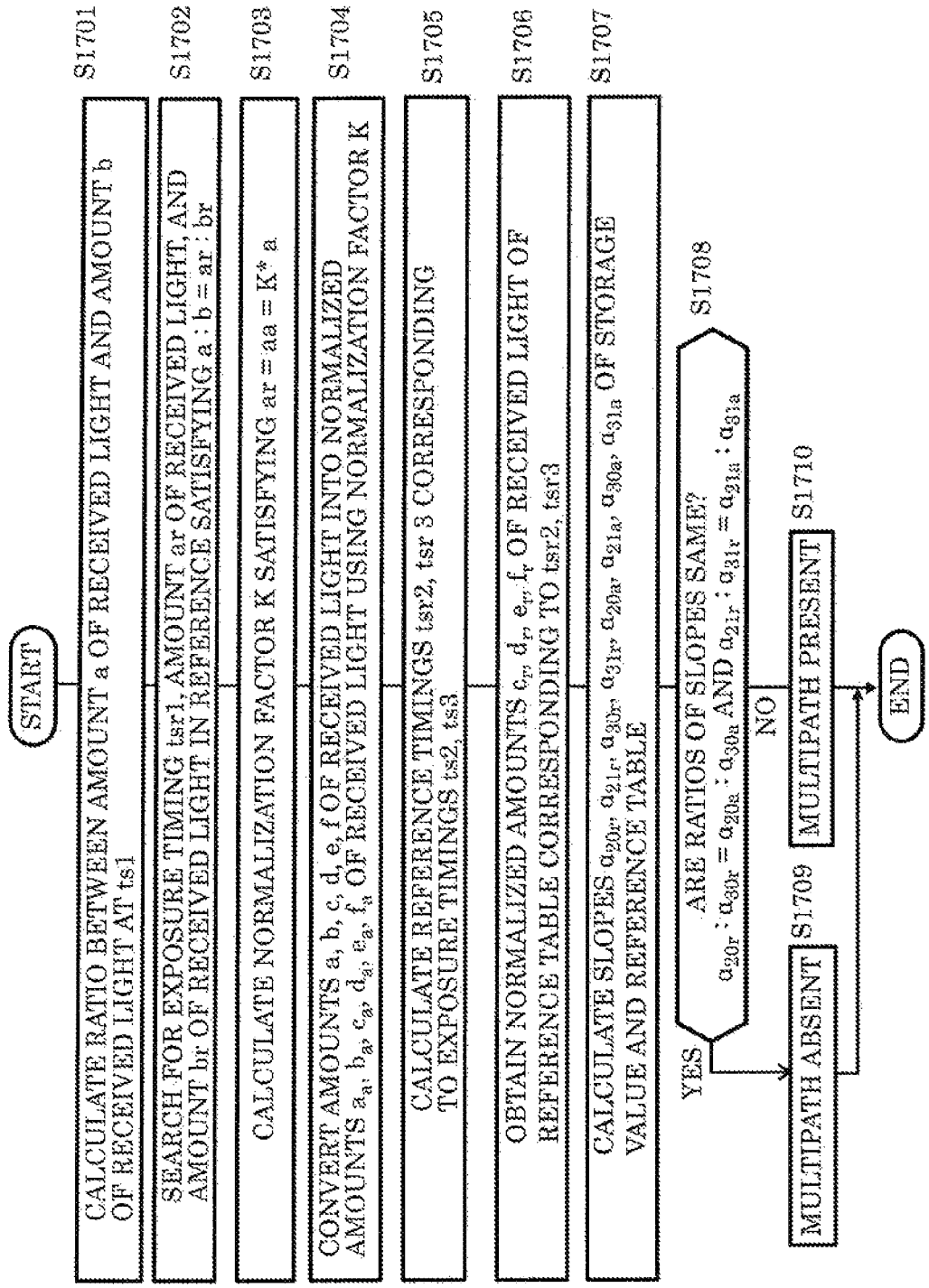
FIG. 17 is a flowchart illustrating one example of a multipath detection method performed by a multipath detector according to Embodiment 2.

FIG. 17 is a flowchart illustrating one example of the multipath detection method performed by the multipath detector according to Embodiment 2.

In S1701, the ratio between amounts a, b of received light at ts1 out of the data stored in signal storage 702 is calculated.

In S1702, reference timing tsr1 at which the ratio between amounts a, b of received light and the ratio between normalized amounts ar, br of received light in the reference holder match is searched for. When there is no match between the ratio between amounts a, b of received light and the ratio between normalized amounts ar, br of received light, a portion covering the signal ratios is searched for, and reference timing tsr1 is estimated through point-to-point linear interpolation.

In S1703, normalization factor K for changing the amount of received light at ts1 into a normalized amount of received light at tsr1 is calculated. Normalization factor K is calculated according to the following expression.

[Math. 20]

$$K = 1/(a+b) \qquad \text{Expression 20}$$

In S1704, amounts a, b, c, d, e, f of received light are converted into normalized amounts $a_a$, $b_a$, $c_a$, $d_a$, $e_a$, $f_a$ of received light using normalization factor K calculated in S1703. The calculation expressions are as follows.

[Math. 21]

$$a_a = K \times a \qquad \text{Expression 21-1}$$

$$b_a = K \times b \qquad \text{Expression 21-2}$$

$$c_a = K \times c \qquad \text{Expression 21-3}$$

$$d_a = K \times d \qquad \text{Expression 21-4}$$

$$e_a = K \times e \qquad \text{Expression 21-5}$$

$$f_a = K \times f \qquad \text{Expression 21-6}$$

In S1705, reference timing tsr2 and reference timing tsr3 in the reference table that correspond to exposure timing ts2 and exposure timing ts3, respectively, are calculated. The calculation expressions are as follows.

[Math. 22]

$$tsr2 = tsr1 - \Delta tp \qquad \text{Expression 22-1}$$

$$tsr3 = tsr1 + \Delta tb \qquad \text{Expression 22-2}$$

Forward shift amount Δtp and backward shift amount Δtb for multipath detection have values indicated by timing indicator 701.

In S1706, normalized amounts $c_r$, $d_r$, $e_r$, $f_r$ of received light in the reference that correspond to reference timings tsr2, tsr3 calculated in S1705 are obtained. When there is no reference that matches tsr2, tsr3, estimation is made using the linear interpolation. Calculation is not necessary for normalized amounts $a_r$, $b_r$ in the reference because normalization factor K is set so that normalized amounts $a_r$, $b_r$ are equal to $a_a$, $b_a$.

In S1707, slopes $\alpha_{20a}$, $\alpha_{21a}$, $\alpha_{30a}$, $\alpha_{31a}$ between the normalized amounts of received light in the storage values and slopes $\alpha_{20r}$, $\alpha_{21r}$, $\alpha_{30r}$, $\alpha_{31r}$ between the normalized amounts of received light in the reference are calculated. Specifically, slope $\alpha_{20a}$ of the straight line connecting normalized amounts $a_a$, $c_a$ of received light in the storage values, slope $\alpha_{30a}$ of the straight line connecting normalized amounts $a_a$, $e_a$ of received light in the storage values, slope $\alpha_{21a}$ of the straight line connecting normalized amounts $b_a$, $d_a$ of received light in the storage values, slope $\alpha_{31a}$ of the straight line connecting normalized amounts $b_a$, $f_a$ of received light in the storage values, slope $\alpha_{20r}$ of the straight line connecting normalized amounts $a_r$, $c_r$ of received light in the reference, slope $\alpha_{30r}$ of the straight line connecting normalized amounts $a_r$, $e_r$ of received light in the reference, slope $\alpha_{21r}$ of the straight line connecting normalized amounts $b_r$, $d_r$ of received light in the reference, and slope $\alpha_{31r}$ of the straight line connecting normalized amounts $b_r$, $f_r$ of received light in the reference are calculated according to the following expressions.

[Math. 23]

$$\alpha_{20a} = (c_a - a_a)/(ts2 - ts1) \qquad \text{Expression 23-1}$$

$$\alpha_{30a} = (e_a - a_a)/(ts3 - ts1) \qquad \text{Expression 23-2}$$

$$\alpha_{21a} = (d_a - b_a)/(ts2 - ts1) \qquad \text{Expression 23-3}$$

$$\alpha_{31a} = (f_a - b_a)/(ts3 - ts1) \qquad \text{Expression 23-4}$$

$$\alpha_{20r} = (c_r - a_r)/(tsr2 - tsr1) \qquad \text{Expression 23-5}$$

$$\alpha_{30r} = (e_r - a_r)/(tsr3 - tsr1) \qquad \text{Expression 23-6}$$

$$\alpha_{21r} = (d_r - b_r)/(tsr2 - tsr1) \qquad \text{Expression 23-7}$$

$$\alpha_{31r} = (f_r - b_r)/(tsr3 - tsr1) \qquad \text{Expression 23-8}$$

In S1708, it is determined whether the ratios of the straight lines calculated in S1707 are the same. The comparison expression is as indicated in S1708. Here, the ratios of the slopes are used in the calculation. The amount of signals decreases depending on the distance light travels or the reflectivity of an object irradiated with the light, and the slope of the normalized amount of received light in the storage value that has been calculated as described above changes accordingly; thus, it is not appropriate to compare the values of the slopes themselves. The ratio of the slopes before and after the shift amount is the same as long as the pulse waveform is the same regardless of an increase or a decrease in the amount of signals and thus does not depend on the travel distance of the reflected light or the reflectivity of the object. Therefore, by using the ratio of the slopes, it is possible to detect a change in the waveform that has been made due to the effect of multipath. Thus, when it is determined in S1708 that the ratios of the slopes are the same, the processing proceeds to S1709 and it is determined that there is no multipath. When it is determined in S1708 that the ratios of the slopes are not the same, the processing proceeds to S1710 and it is determined that there is multipath.

Next, a method for calculating a correction factor according to Embodiment 2 will be described.

Figure 18:
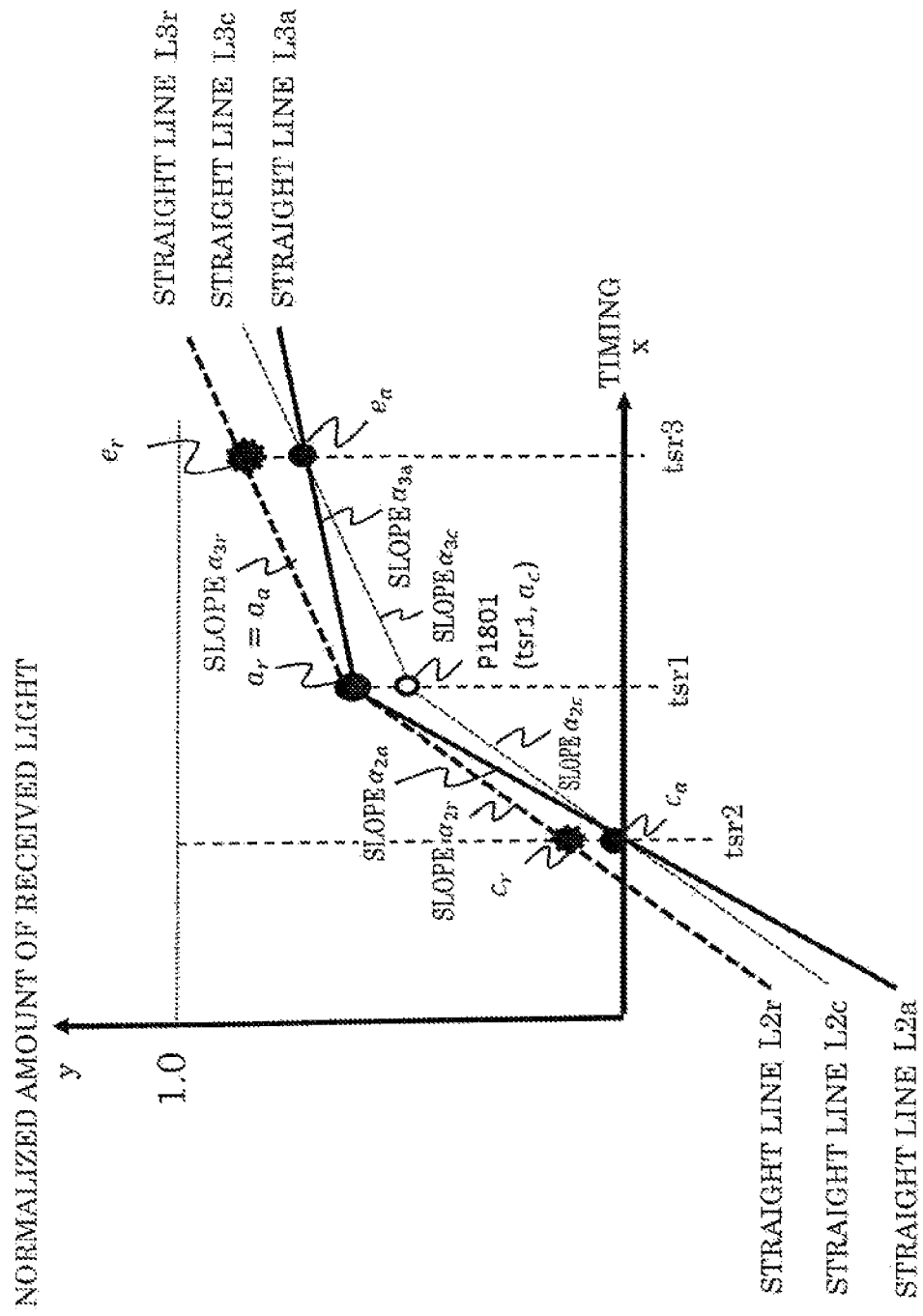
FIG. 18 is an explanatory diagram illustrating a correction factor calculation example of a multipath detector according to Embodiment 2.

FIG. 18 is an explanatory diagram illustrating a multipath correction factor calculation example according to Embodiment 2. In this figure, the straight lines connecting points of the normalized amounts of received light stored in signal storage 702 are denoted as L2a, L3a, the slopes thereof are denoted as $\alpha_{2a}$, $\alpha_{3a}$, and the straight lines connecting points of the normalized amount of received light of the reference tables are denoted as L2r, L3r. When there is multipath, the ratios of the slopes do not match as described above. Here, point P1801 (tsr1, $a_c$) having the same slope as that of the reference table is calculated. Since $a_c$ can be said as the normalized amount of received light after multipath correction, when the straight line connecting normalized amount $a_c$ of received light after multipath correction and normalized amount $c_a$ of received light in the storage value is denoted as L2c, the straight line connecting normalized amount $a_c$ of received light after multipath correction and normalized amount $e_a$ of received light in the storage value is denoted as L3c, the slope of straight line L2c is denoted as $\alpha_{2c}$, and the slope of straight line L3c is denoted as $\alpha_{3c}$, it is sufficient that normalized amount $a_c$ of received light after multipath correction that satisfies the following be calculated.

[Math. 24]

$$\alpha_{2r}:\alpha_{3r}=\alpha_{2c}:\alpha_{3c} \qquad \text{Expression 24}$$

The coordinate values of each point are assigned to this expression, and solving for $a_c$ leads to Expression 25. Furthermore, correction factor $C_0$, which is used to correct the storage value to obtain a value after multipath correction, is represented by Expression 26.

[Math. 25]

$$a_c = \frac{c_a(e_r - a_r) - e_a(c_r - a_r)}{e_r - c_r} \qquad \text{Expression 25}$$

[Math. 26]

$$C_0 = \frac{a_c}{a_a} \qquad \text{Expression 26}$$

Figure 19:
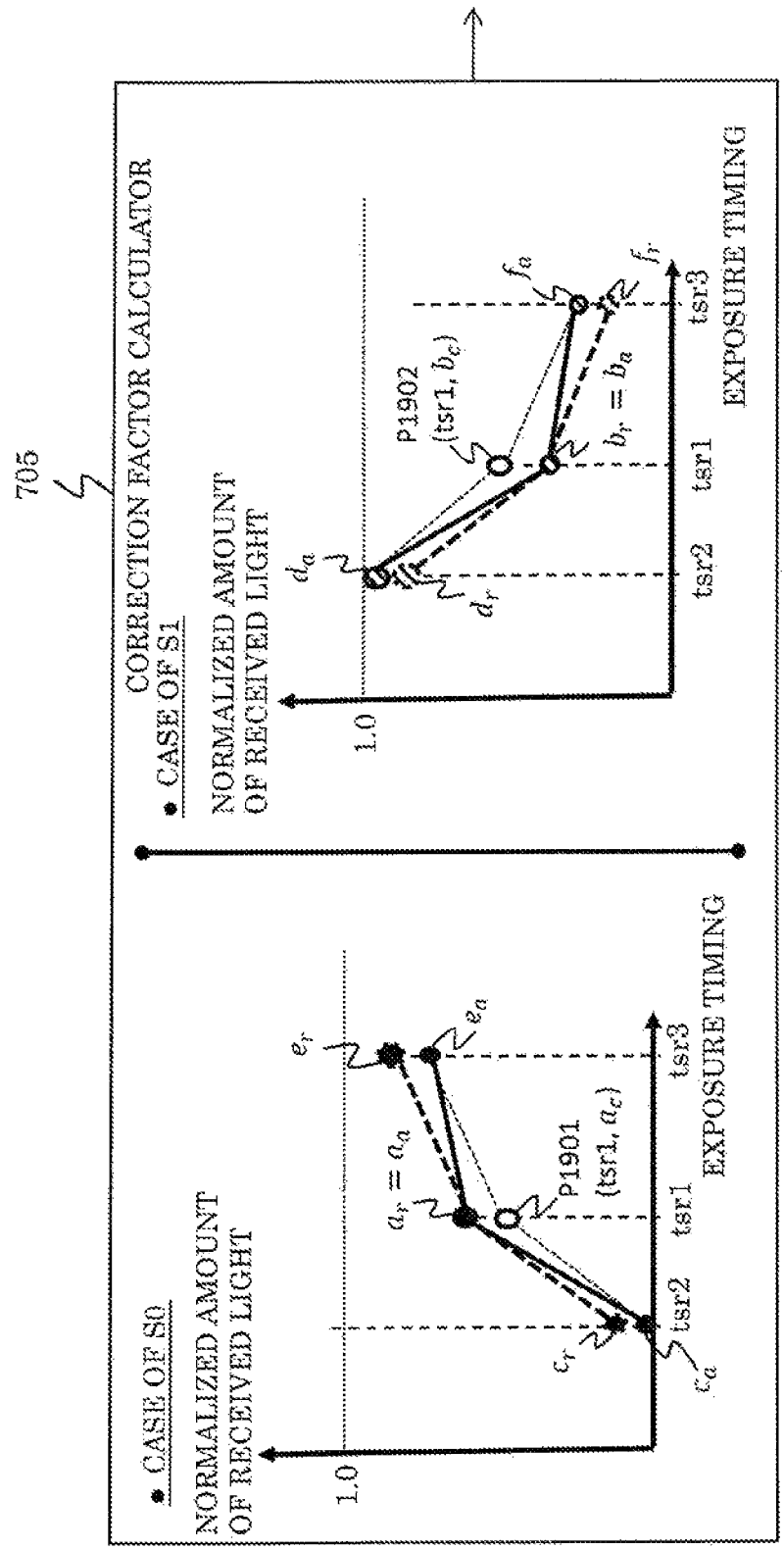
FIG. 19 is an explanatory diagram illustrating a correction factor calculation example of a multipath detector according to Embodiment 2.

FIG. 19 is an explanatory diagram illustrating a correction factor calculation example of multipath detector 111 according to Embodiment 2. When the correction factor calculation method illustrated in FIG. 18 is applied, in the case of the S0 signal, a point having the same slope as that in the reference is P1901, and correction factor $C_0$ is calculated using Expression 25 and Expression 26. In the case of the S1 signal, a point having the same slope as that in the reference is P1902, and correction factor $C_1$ can be calculated using Expression 27 and Expression 28.

[Math. 27]

$$b_c = \frac{d_a(f_r - b_r) - f_a(d_r - b_r)}{f_r - d_r} \qquad \text{Expression 27}$$

[Math. 28]

$$C_1 = \frac{b_c}{b_a} \qquad \text{Expression 28}$$

In the multipath correction, the correction is made using the correction factor according to the following expressions.

[Math. 29]

S0 after correction=amount $a$ of received light×$C_0$  Expression 29-1

S1 after correction=amount $b$ of received light×$C_1$  Expression 29-2

Embodiment 2 describes a method for detecting multipath and making correction with exposure timings in less pairs than those in Embodiment 1. In Embodiment 2, it is possible to shorten the time to store data by reducing the number of required exposure timings.

In Embodiments 1 and 2, the exposure timings are described as being sequentially set, but, with an imaging element in which more than one timing can be set for one-frame exposure, necessary timings may be set at the same time and all the results may be stored into the storage.

The present specification has described an example in which the estimation is made using the linear interpolation, for example, in the search for the reference table, but this is not limiting. A model of the reference table may be created using an n-th function, a power function, or the like on the basis of the shape of the reference table.

As described above, in distance information acquisition device 100 according to Embodiment 2, the plurality of pairs include the first through N-th pairs (N is an even number) in ascending order of the time difference, and the emission/exposure controller (101) generates the timing signal to alternately arrange one pair selected in ascending order of the time difference and one pair selected in descending order of the time difference.

With this, it is possible to further reduce the number of pairs of the emission pulse and the exposure pulse and further lessen the processing load.

Here, the distance information acquisition device may further include a distance calculator which generates, using the sequence of received light signals, a distance image indicating the distance to each pixel.

With this, in the multipath detection operation, a normal distance measurement operation can also be performed at the same time, and thus it is possible to lessen or conceal the processing load for detecting multipath.

Embodiment 3

Next, distance information acquisition device 100 according to Embodiment 3 will be described. Embodiments 1 and 2 have described examples in which the plurality of pairs including the emission pulse and the exposure pulse are generated in a time series. In contrast, Embodiment 3 describes a configuration example in which a plurality of pairs are concurrently generated in association with a plurality of pixels.

[3.1 Configuration Example of Distance Information Acquisition device 100]

Distance information acquisition device 100 according to Embodiment 3 may have the same configuration as that in FIG. 7A and FIG. 7B. However, solid-state imaging element 102 and multipath detector 111 are slightly different. The following description will be centered on the points of difference.

Figure 20:
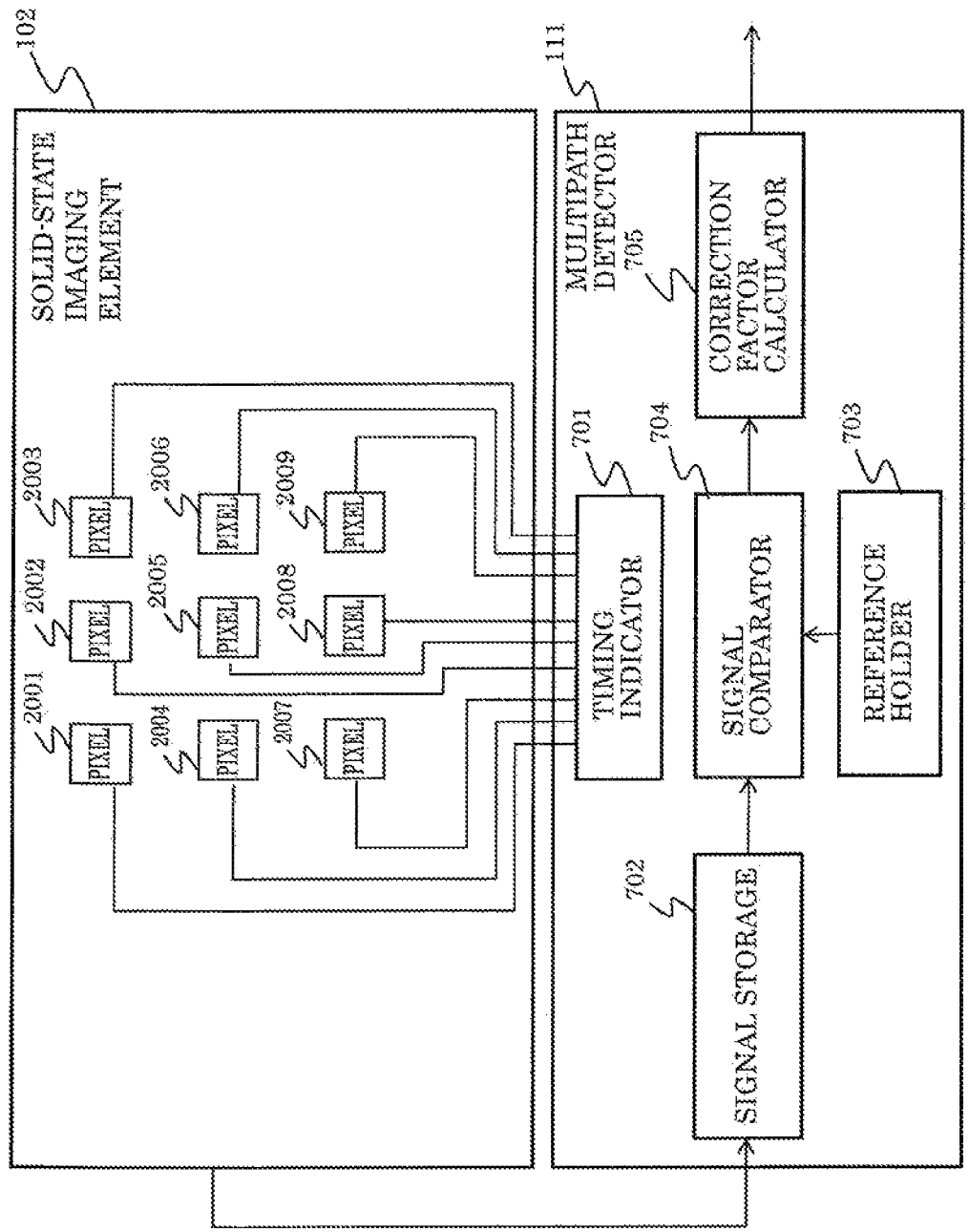
FIG. 20 is a block diagram illustrating a configuration example of a distance information acquisition device according to Embodiment 3.

FIG. 20 is a block diagram illustrating a configuration example of the distance information acquisition device according to Embodiment 3. In this figure, illustrations of points that are the same as those in FIG. 7A and FIG. 7B are omitted, but the points of difference from those in FIG. 7A and FIG. 7B are illustrated.

Timing indicator 701 generates timing signals for the first through N-th pairs concurrently. Here, N is an integer greater than or equal to 6; in FIG. 20, N is 9.

Solid-state imaging element 102 includes pixel 2001 to pixel 2009. Pixel 2001 to pixel 2009 respectively correspond to the first through N-th pairs. Different timing signals are input to pixel 2001 to pixel 2009. Among the timing signals, an emission control signal indicating emission is common to pixel 2001 to pixel 2009 and is input to light emitter 104. Among the timing signals, an exposure control signal indicating exposure is specific to each of pixel 2001 to pixel 2009 and indicates exposure at a different timing. In this figure, timing indicator 701 inputs, to pixel 2001 to pixel 2009, nine exposure control signals indicating nine different exposure timings.

Timing indicator 701 generates the timing signals indicating the first through N-th pairs concurrently.

Embodiments 1 and 2 have described the sequential timing setting method for the first through N-th pairs, but, in Embodiment 3, the first through N-th pairs are associated with n pixels, and signals of received light are output concurrently from the n pixels.

FIG. 20 illustrates a method for indicating timings for the plurality of pixels. The pixels in solid-state imaging element 102 are denoted as pixel 2001, pixel 2002, pixel 2003, pixel 2004, pixel 2005, pixel 2006, pixel 2007, pixel 2008, and pixel 2009. Here, for the sake of simplicity, the nine pixels are illustrated, which is not limiting. N pixels may be used as in Embodiment 1 or six pixels may be used as in Embodiment 2. Timing indicator 701 indicates timings for pixel 2001 to pixel 2009. Pixel 2001 to pixel 2009 perform exposure at the indicated timings and store amounts A1 to A9 of received light into signal storage 702. Specifically, in signal storage 702, nine points of signal amounts A1 to A9 are plotted for nine exposure timings with the exposure timing on the horizontal axis and the amount of received light on the vertical axis.

The plotted result is used for the multipath detection and the correction factor calculation as in Embodiment 1 or 2. Note that in Embodiments 1 and 2, one multipath detection result is obtained and one correction factor is calculated for each pixel, but, in the present embodiment, one result and one correction factor are output for nine pixels. In other words, it is possible to detect multipath for pixel 2001 to pixel 2009 and calculate one correction factor for pixel 2001 to pixel 2009 to correct the multipath.

Furthermore, it is possible to obtain a necessary amount of received light with a smaller number of frames than in Embodiments 1 and 2, making the multipath detection and the correction faster.

As described above, in distance information acquisition device 100 according to Embodiment 3, the plurality of pairs include the first through N-th pairs (N is an integer greater than or equal to 6), the first through N-th pairs share one emission pulse, the first through N-th pairs respectively correspond to the first through N-th pixels included in the solid-state imaging element, and emission/exposure controller 101 concurrently generates N timing signals indicating the exposure in the first through N-th pairs and supplies the N timing signals to the first through N-th pixels.

With this, N pairs of emission and exposure are performed in the N pixels at the same time, and thus real-time processing of the multipath detection operation is facilitated.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a distance information acquisition device, a multipath detection device, and a multipath detection method for detecting multipath; for example, a ToF camera system.

What is claimed is:

1. A distance information acquisition device, comprising:
    a light emitter which emits light according to an emission pulse indicating emission;
    a solid-state imaging element which performs exposure according to an exposure pulse indicating exposure;
    an emission/exposure controller which generates a timing signal indicating a plurality of pairs of the emission pulse and the exposure pulse that have a time difference, the time difference being different in each of the plurality of pairs; and
    a multipath detector which obtains a sequence of received light signals from the solid-state imaging element by the emission and the exposure that correspond to each of the plurality of pairs, compares the sequence of received light signals that has been obtained and reference data created in advance as a model of a sequence of received light signals in a multipath-free environment, and determines a presence or absence of multipath according to a difference in a comparison result.

2. The distance information acquisition device according to claim 1, wherein
    a total number of the plurality of pairs is six or more.

3. The distance information acquisition device according to claim 1, wherein
    the time difference between the emission pulse and the exposure pulse in each of the plurality of pairs differs by a fixed amount of time.

4. The distance information acquisition device according to claim 1, wherein
    the emission/exposure controller changes a timing of the exposure pulse relative to a timing of the emission pulse in the plurality of pairs.

5. The distance information acquisition device according to claim 1, wherein the emission/exposure controller changes a timing of the emission pulse relative to a timing of the exposure pulse in the plurality of pairs.

6. The distance information acquisition device according to claim 1, wherein
a width of the exposure pulse is greater than or equal to a width of the emission pulse.

7. The distance information acquisition device according to claim 1, wherein
the plurality of pairs include first through N-th pairs, N being an integer, and
the emission/exposure controller generates the timing signal to cause the first through N-th pairs to be produced on a time-series basis.

8. The distance information acquisition device according to claim 1, wherein
the plurality of pairs include first through N-th pairs in ascending order of the time difference, N being an even number, and
the emission/exposure controller generates the timing signal to alternately arrange one pair selected in the ascending order of the time difference and one pair selected in descending order of the time difference.

9. The distance information acquisition device according to claim 1, wherein
the time difference between emission pulses in the plurality of pairs is a fixed amount of time.

10. The distance information acquisition device according to claim 1, wherein
the plurality of pairs include first through N-th pairs, N being an integer greater than or equal to 6,
the first through N-th pairs share one emission pulse,
the first through N-th pairs respectively correspond to first through N-th pixels included in the solid-state imaging element, and
the emission/exposure controller concurrently generates N timing signals indicating the exposure in the first through N-th pairs and supplies the N timing signals to the first through N-th pixels.

11. The distance information acquisition device according to claim 1, wherein
the multipath detector includes a reference data holder which holds the reference data, and
the reference data is a model of the sequence of received light signals in the multipath-free environment.

12. The distance information acquisition device according to claim 1, wherein
the multipath detector includes a reference data holder which holds the reference data, and
the reference data is a length of time determined according to a sum of a pulse width of the emission pulse and a pulse width of the exposure pulse.

13. The distance information acquisition device according to claim 1, wherein
when the multipath detector determines that the multipath is present, the multipath detector further calculates a correction factor for each pixel.

14. The distance information acquisition device according to claim 13, wherein
the multipath detector calculates the correction factor according to a comparison result indicating a ratio between the sequence of received light signals and the reference data.

15. The distance information acquisition device according to claim 1, further comprising:
a distance calculator which generates, using the sequence of received light signals, a distance image indicating a distance to each pixel.

16. A multipath detection device for detecting multipath using a light emitter which emits light according to an emission pulse indicating emission and a solid-state imaging element which performs exposure according to an exposure pulse indicating exposure, the multipath detection device comprising:
an emission/exposure controller which generates a timing signal indicating a plurality of pairs of the emission pulse and the exposure pulse that have a time difference, the time difference being different in each of the plurality of pairs; and
a multipath detector which obtains a sequence of received light signals from the solid-state imaging element by the emission and the exposure that correspond to each of the plurality of pairs, compares the sequence of received light signals that has been obtained and reference data created in advance as a model of a sequence of received light signals in a multipath-free environment, and determines a presence or absence of multipath according to a difference in a comparison result.

17. A multipath detection method for detecting multipath using a light emitter which emits light according to an emission pulse indicating emission and a solid-state imaging element which performs exposure according to an exposure pulse indicating exposure, the multipath detection method comprising:
generating a timing signal indicating a plurality of pairs of the emission pulse and the exposure pulse that have a time difference, the time difference being different in each of the plurality of pairs;
obtaining a sequence of received light signals from the solid-state imaging element by the emission and the exposure that correspond to each of the plurality of pairs;
comparing the sequence of received light signals that has been obtained and reference data created in advance as a model of a sequence of received light signals in a multipath-free environment; and
determining a presence or absence of multipath according to a difference in a comparison result.

* * * * *